US012005826B2

(12) United States Patent
Kanitz

(10) Patent No.: US 12,005,826 B2
(45) Date of Patent: Jun. 11, 2024

(54) AUTOMATED DELIVERY SYSTEMS FOR AUTONOMOUS VEHICLES

(71) Applicant: UATC, LLC, Mountain View, CA (US)

(72) Inventor: Daniel Adam Kanitz, Pittsburgh, PA (US)

(73) Assignee: UATC, LLC, Mountain View, CA (US)

(*) Notice: Subject to any disclaimer, the term of this patent is extended or adjusted under 35 U.S.C. 154(b) by 0 days.

(21) Appl. No.: 17/940,447

(22) Filed: Sep. 8, 2022

(65) Prior Publication Data

US 2023/0001837 A1 Jan. 5, 2023

Related U.S. Application Data

(63) Continuation of application No. 16/037,719, filed on Jul. 17, 2018, now Pat. No. 11,447,055.
(Continued)

(51) Int. Cl.
*B60P 3/00* (2006.01)
*B60P 1/36* (2006.01)
(Continued)

(52) U.S. Cl.
CPC ............... *B60P 3/007* (2013.01); *B60P 1/36* (2013.01); *B60S 1/64* (2013.01); *A47L 7/0076* (2013.01);
(Continued)

(58) Field of Classification Search
CPC ....... A47L 7/0046; B25J 11/0085; B60P 1/36; B60P 3/007; B60S 1/64
See application file for complete search history.

(56) References Cited

U.S. PATENT DOCUMENTS 3,295,635 A * 1/1967 Cahn ............... B64D 11/0007
198/801
4,056,194 A 11/1977 Radek
(Continued)

FOREIGN PATENT DOCUMENTS

DE 9106352 4/1991
DE 102011010205 A1 10/2011
(Continued)

OTHER PUBLICATIONS

Abuelsamid, Sam. "Domino's Takes High-Tech Pizza Delivery to Level 4 With Ford" Forbes, Aug. 29, 2017, 7 pages.
(Continued)

*Primary Examiner* — James Keenan
(74) *Attorney, Agent, or Firm* — Dority & Manning, P.A.

(57) ABSTRACT

Systems and methods are directed to automated delivery systems. In one example, a vehicle is provided including a drive system, a passenger cabin; and a delivery service pod provided relative to the passenger cabin. The delivery service pod includes an access unit configured to allow for loading and unloading of a plurality of delivery crates into the delivery service pod. The delivery service pod further includes a conveyor unit comprising multiple delivery crate holding positions, the delivery crate holding positions being defined by neighboring sidewalls spaced apart within the delivery service pod such that a respective delivery crate of the plurality of delivery crates can be positioned between neighboring sidewalls, wherein the conveyor unit is configured to be rotated to align each of the delivery crate holding positions with the access unit.

20 Claims, 11 Drawing Sheets

Related U.S. Application Data

(60) Provisional application No. 62/674,674, filed on May 22, 2018.

(51) Int. Cl.
    *B60S 1/64*     (2006.01)
    *A47L 7/00*     (2006.01)
    *B25J 11/00*     (2006.01)
    *B25J 15/02*     (2006.01)
    *B25J 19/02*     (2006.01)

(52) U.S. Cl.
    CPC ........ *A47L 2201/04* (2013.01); *B25J 11/0085* (2013.01); *B25J 15/0206* (2013.01); *B25J 19/023* (2013.01)

(56) References Cited

U.S. PATENT DOCUMENTS

| | | | |
|---|---|---|---|
| 4,698,775 A | 10/1987 | Koch et al. | |
| 5,159,994 A | 11/1992 | Luria | |
| 6,711,459 B1 * | 3/2004 | Sanchez Gomez | B60P 3/007 700/214 |
| 7,765,780 B2 | 8/2010 | Koselka et al. | |
| 8,437,875 B2 | 5/2013 | Hernandez et al. | |
| 9,256,852 B1 | 2/2016 | Myllymaki | |
| 10,046,689 B2 | 8/2018 | Wilkinson et al. | |
| 10,899,543 B2 * | 1/2021 | Pompen | B65G 1/1378 |
| 10,990,910 B2 * | 4/2021 | Bischoff | B60P 3/007 |
| 11,222,378 B2 | 1/2022 | Ferguson et al. | |
| 11,237,569 B2 * | 2/2022 | Kuo | G06Q 10/08355 |
| 11,420,740 B2 * | 8/2022 | Braun | B64C 39/024 |
| 2015/0006005 A1 | 1/2015 | Yu et al. | |
| 2017/0121023 A1 | 5/2017 | High et al. | |
| 2017/0210353 A1 | 7/2017 | Stauffer et al. | |
| 2017/0297537 A1 | 10/2017 | Yako et al. | |

FOREIGN PATENT DOCUMENTS

| | | |
|---|---|---|
| DE | 102016009585 A1 | 2/2017 |
| DE | 102017006806 A1 | 1/2018 |
| EP | 3189903 A2 | 7/2017 |
| EP | 3228496 A2 | 10/2017 |
| EP | 3254893 A1 | 12/2017 |
| GB | 2551909 | 1/2018 |
| JP | 60031405 A | 2/1985 |
| JP | 60082509 A | 5/1985 |
| KR | 101721233 B1 | 3/2017 |
| WO | WO2018033283 A1 | 2/2018 |

OTHER PUBLICATIONS

Lonsdorf, Kat. "Hungry? Call Your Neighborhood Delivery Robot" NPR All Tech Considered, Mar. 23, 2017, 14 pages.

O'Kane, Sean. "These six-wheeled robots are about to start delivering food in the US" The Verge, Jan. 18, 2017, 4 pages.

Woyke, Elizabeth. "FedEx Bets on Automation as it Prepares to Fend Off Uber and Amazon" Technology Review, Feb. 3, 2017, 6 pages.

International Search Report and Written Opinion for PCT/US2019/032781, dated Aug. 8, 2019, 11 pages.

\* cited by examiner

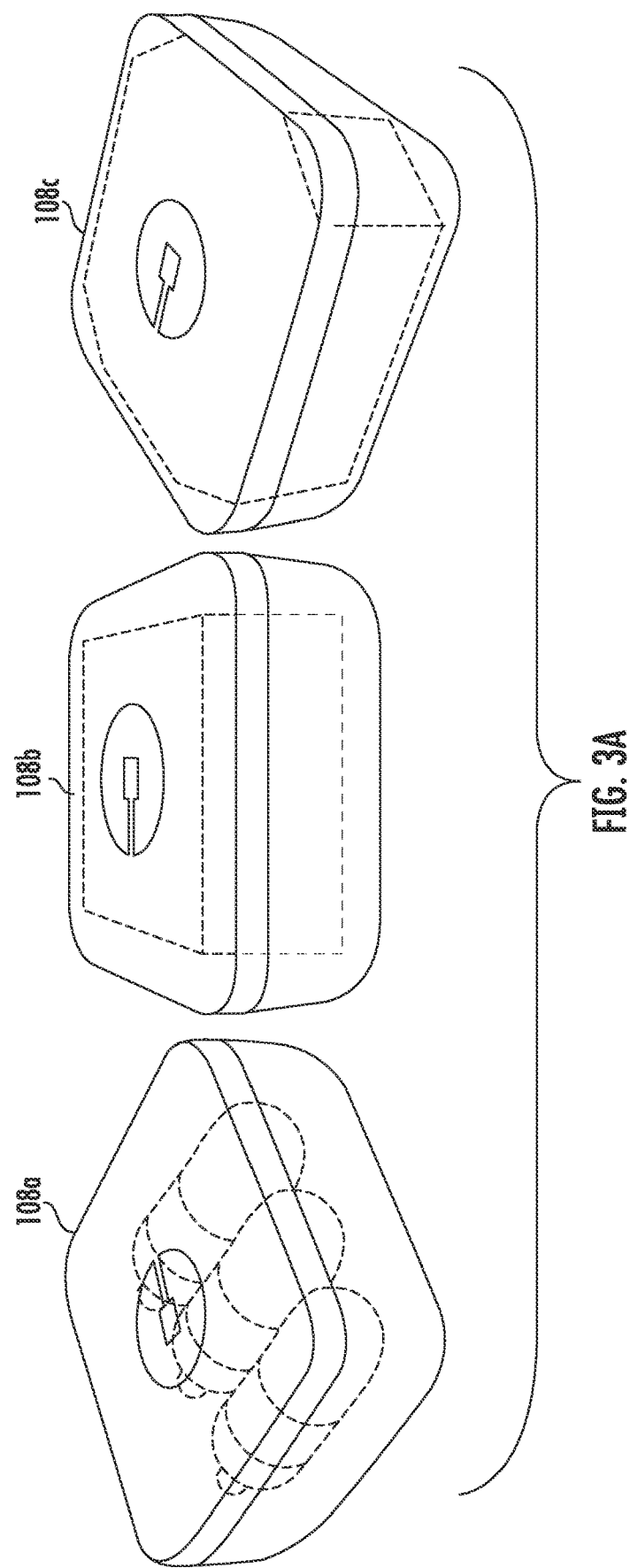

AUTOMATED DELIVERY SYSTEMS FOR AUTONOMOUS VEHICLES

The present application is based on and claims the benefit of U.S. Provisional Application 62/674,674 having a filing date of May 22, 2018 and is a continuation of U.S. patent application Ser. No. 16/037,719 having a filing date of Jul. 17, 2018, both of which are hereby incorporated by reference herein in their entirety for all purposes.

FIELD

The present disclosure relates generally to provision of delivery services. More particularly, the present disclosure relates to systems and methods that provide for automated delivery systems associated with vehicles.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. This can allow an autonomous vehicle to navigate without human intervention and, in some cases, even omit the use of a human driver altogether.

SUMMARY

Aspects and advantages of embodiments of the present disclosure will be set forth in part in the following description, or can be learned from the description, or can be learned through practice of the embodiments.

One example aspect of the present disclosure is directed to a vehicle including a drive system, a passenger cabin; and a delivery service pod provided relative to the passenger cabin. The delivery service pod includes an access unit configured to allow for loading and unloading of a plurality of delivery crates into the delivery service pod. The delivery service pod further includes a conveyor unit comprising multiple delivery crate holding positions, the delivery crate holding positions being defined by neighboring sidewalls spaced apart within the delivery service pod such that a respective delivery crate of the plurality of delivery crates can be positioned between neighboring sidewalls, wherein the conveyor unit is configured to be rotated to align each of the delivery crate holding positions with the access unit.

Another example aspect of the present disclosure is directed to a delivery system for use with a vehicle. The delivery system includes a plurality of delivery crates and a delivery service pod disposed relative to a passenger compartment of the vehicle. The delivery service pod includes an access unit configured to allow for loading and unloading of a plurality of delivery crates in the delivery service pod. The delivery service pod further includes a conveyor unit comprising multiple delivery crate holding positions, the delivery crate holding positions being defined by neighboring sidewalls spaced apart within the delivery service pod such that a respective delivery crate of the plurality of delivery crates can be positioned between neighboring sidewalls, wherein the conveyor unit is configured to be rotated to align each of the delivery crate holding positions with the access unit.

Another example aspect of the present disclosure is directed to an autonomous vehicle. The autonomous vehicle includes a drive system, a passenger cabin, a delivery system, and a vehicle cleaning system. The delivery system includes a plurality of delivery crates and a delivery service pod disposed relative to a passenger compartment of the vehicle. The delivery service pod includes an access unit configured to allow for loading and unloading of a plurality of delivery crates in the delivery service pod. The delivery service pod further includes a conveyor unit comprising multiple delivery crate holding positions, the delivery crate holding positions being defined by neighboring sidewalls spaced apart within the delivery service pod such that a respective delivery crate of the plurality of delivery crates can be positioned between neighboring sidewalls, wherein the conveyor unit is configured to be rotated to align each of the delivery crate holding positions with the access unit. The vehicle cleaning system includes a vacuum unit and a robotic manipulator. The robotic manipulator includes an arm including a plurality of arm sections, a gripper unit positioned at a distal end of the arm, and a camera associated with the gripper unit. The vehicle cleaning system further includes the robotic manipulator connected to the vacuum unit such that the arm provides a vacuum path between the vacuum unit and the gripper unit. The robotic manipulator is configured to be deployed from a central cavity configured within the underside of the delivery service pod and having access to the passenger cabin of the vehicle.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 3A-3B depict an example delivery crate according to example embodiments of the present disclosure;

DETAILED DESCRIPTION

Figure 1:
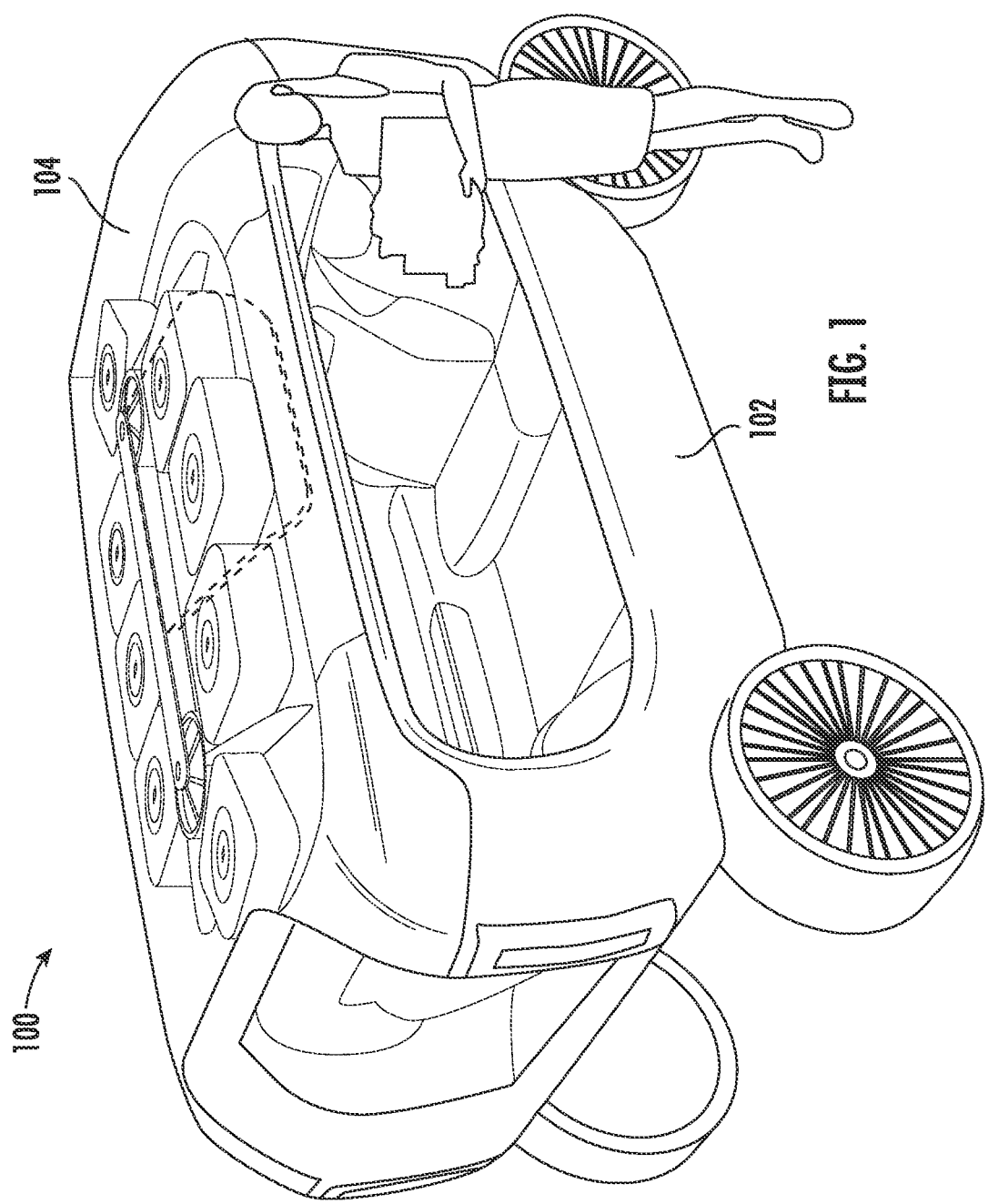
FIG. 1 depicts an example of an autonomous vehicle with an integrated delivery system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to automated delivery systems for vehicles. In particular, the systems and methods of the present disclosure can allow for integrating an automated delivery system into a vehicle, such as an autonomous vehicle, that is also configured to provide passenger services. The systems and methods of the present disclosure can facilitate maximizing utilization of a vehicle fleet as demand shifts among different service products throughout a day. For example, the systems and methods of the present disclosure can provide for vehicles that allow for a mix of passenger services and delivery services, thereby allowing for maximizing trip efficiency and increasing the amount of time a vehicle is in service, such as buffering certain delivery trips to be completed during non-peak passenger travel times, buffering delivery trips along routes to coincide with expected passenger travel, and/or the like.

More particularly, an entity (e.g., service provider, owner, manager) can use one or more vehicles (e.g., ground-based vehicles) to provide a vehicle service such as a transportation service (e.g., rideshare service), a courier service, a delivery service, etc. The vehicles can comprise a drive system at least including an engine/transmission/axle assembly for transferring torque to the wheels for driving the vehicle. The vehicle(s) can be an autonomous vehicle(s) that includes various systems and devices configured to control the operation of the vehicle(s). For example, an autonomous vehicle can include an onboard vehicle computing system for operating the vehicle (e.g., located on or within the autonomous vehicle). The vehicle computing system can receive sensor data from sensor(s) onboard the vehicle (e.g., cameras, LIDAR, RADAR), attempt to comprehend the vehicle's surrounding environment by performing various processing techniques on the sensor data, and generate an appropriate motion plan through the vehicle's surrounding environment. The vehicle computing system can control (e.g., via a vehicle controller, etc.) one or more vehicle controls (e.g., actuators or other devices that control acceleration, throttle, steering, braking, etc.) to execute the motion plan. Moreover, the autonomous vehicle can be configured to communicate with one or more computing devices that are remote from the vehicle. For example, the autonomous vehicle can communicate with an operations computing system that can be associated with the entity. The operations computing system can help the entity monitor, communicate with, manage, etc. the fleet of vehicles.

According to an aspect of the present disclosure, an automated delivery system can include a delivery service pod that is integrated into the roof space of a vehicle, such as an autonomous vehicle. In some implementations, the delivery service pod can be configured to optimize the space required for the pod such that it has minimal or no impact on the passenger cabin space of the vehicle. In some implementations, the delivery system can be configured such that the delivery service pod is configured as a separate compartment from the passenger cabin of a vehicle, thereby isolating the delivery contents from passengers within the vehicle. By isolating deliveries from the passenger cabin air, passenger irritation from delivery odors and the like can be minimized or eliminated.

According to an aspect of the present disclosure, in some implementations, a delivery service pod can comprise a conveyor unit such as a belt driven, carousel-style or looped conveyor (e.g., capable of moving objects in a continuous loop, etc.) that can provide for optimizing access and handling for a plurality of delivery crates contained within the pod. In some implementations, the conveyor unit can include pre-defined positions (e.g., holding positions) for a plurality of delivery crates, for instance, using a series of sidewalls or divider walls associated with the conveyor that define isolated spaces to securely and separately hold each delivery crate relative to the conveyor. In some implementations, the series of sidewalls or divider walls associated with the conveyor can provide for ensuring that only a designated delivery crate for a recipient (e.g., a delivery crate currently in a retrieval position within the delivery service pod) can be accessed by the recipient (e.g., preventing a recipient from accessing adjacent holding positions when retrieving a designated delivery crate). In some implementations, the delivery service pod can be configured to store up to eight or more delivery crates.

According to another aspect of the present disclosure, an automated delivery system can include a system of delivery crates designed to securely hold a set of packages, containers, and/or the like that make up a distinct delivery unit (e.g., a delivery for a single recipient). In some implementations, the delivery crates can be sized to accommodate a range of typical delivery package sizes. For example, a delivery crate can be configured in a size (e.g., 16.5"×16.5"×7", etc.) to hold a certain number of beverage containers (e.g., three two-liter bottles, etc.), food containers (e.g., three extra-large pizza boxes, multiple food take out containers, etc.), standard mailing packages (e.g., large flat rate shipping boxes, etc.), and/or the like. In some implementations, the delivery crates can be configured to provide thermal stability to the contents (e.g., help maintain cold/warm temperature of the contents, etc.), such as through the use of insulated construction materials and/or the like.

In some implementations, the delivery crates may be constructed with durable insulating materials that can be cleaned and sanitized to allow for reuse of the delivery crates. For example, in some implementations, the delivery system can be configured such that a recipient can remove a delivery crate containing their assigned delivery from the delivery pod, remove the contents of the delivery crate, and reinsert the empty delivery crate into the same position within the delivery pod. Additionally or alternatively, in some implementations, a recipient can remove a delivery crate containing their assigned delivery from the delivery pod and take the delivery crate with them, returning the delivery crate at a later time (e.g., to another delivery vehicle upon requesting a crate return, at a drop off location, etc.). In some such implementations, a monetary cost may be assessed to a recipient for the delivery crate if the delivery crate is not returned within a specified time period after delivery. In some implementations, the delivery crates may be configured to be disposable and/or recyclable, such that a recipient need not return the delivery crate to the service provider.

According to another aspect of the present disclosure, in some implementations, an automated delivery system can provide for notification of a pending delivery to a recipient, for example, through an application running on a user computing device (e.g., smartphone, tablet, computer, etc.). Additionally, the automated delivery system can provide secure access for retrieval of the delivery by the recipient. For example, a recipient (e.g., application user) can receive a notification via an application on their user computing device that a vehicle has arrived or will be arriving soon at the recipient's location with a delivery for the recipient. The recipient can then proceed to the vehicle and request to retrieve the delivery, for example, by scanning or entering an identification code (e.g., via the application, via an interface associated with the vehicle, etc.). Upon confirmation of the identification code, the vehicle (e.g., delivery service pod) can provide the recipient with access to the delivery crate associated with the recipient's delivery (e.g., moving the designated delivery crate to a retrieval position, access unit, etc.).

For example, in some implementations, before or upon arrival at the recipient's location, the delivery system can cause the delivery crate associated with the recipient to be moved in the delivery pod to a retrieval position of the delivery pod (e.g., by rotating the conveyor within the delivery pod to align the holding position of the identified delivery crate with an access unit comprising an access door, panel, hatch, and/or the like of within the exterior wall of the delivery pod). Upon confirmation that the recipient's identification has been verified, the delivery system can cause the access unit door, panel, hatch, and/or the like within the delivery pod to be released and/or opened to provide recipient access to the delivery crate containing the delivery package(s) for the recipient from the exterior of the vehicle. In some implementations, the delivery pod can include an actuator comprised within and/or associated with an access unit that causes the assigned delivery crate to be moved or shifted out of the delivery pod to provide for convenient access and retrieval by the recipient. For example, in some implementations, an access unit can comprise an actuator to move the delivery crate to be delivered, for example, to a transfer unit of the access unit that provides for moving the delivery crate from the conveyor to a position that allows for a recipient to remove the delivery crate from the exterior of the vehicle. In some implementations, the delivery system can verify that the recipient has removed the delivery crate (e.g., by monitoring the status of the delivery crate holding position, by monitoring the status of the access unit, by monitoring the movement of the recipient, by receiving a confirmation from the recipient, etc.) and then cause the delivery pod access unit to be closed and/or secured.

In some implementations, machine learning can be used to understand fleet travel patterns, allowing for vehicle use to be optimized between a mixture of delivery services and passenger services. For example, by gaining an understanding of fleet travel patterns, trips can be utilized with increased efficiency, for instance, by determining deliveries that coincide with passenger travel routes and/or times to optimize distances traveled by vehicles. As another example, in some implementations, deliveries can be buffered throughout the day to optimize in-service time of the vehicles, such as by increasing delivery trips during non-peak passenger travel periods.

According to another aspect of the present disclosure, in some implementations, a delivery system associated with a vehicle (e.g., a ground-based vehicle), as described herein, can further provide for accepting and/or retrieving one or more delivery packages from a delivery drone. In some implementations, the delivery system can accept and/or retrieve a delivery package while the vehicle is stationary or in motion (e.g., traveling to a destination, etc.). For example, in some implementations, a delivery service pod (as described herein) can comprise a package handling unit which can obtain a delivery package from a delivery drone that is positioned proximate to the delivery service pod (e.g., hovering near the vehicle comprising the delivery service pod, landed on the delivery service pod, etc.). In some implementations, the package handling unit of the delivery service pod can further provide for positioning the obtained delivery package within the delivery service pod (e.g., into a conveyer holding position, etc.) such that the obtained delivery package can be safely stored until the delivery package can be provided to/retrieved by a recipient.

In some implementations, a delivery system associated with a vehicle (e.g., a ground-based vehicle) can provide for transferring one or more delivery packages housed within a delivery service pod to a delivery/transfer drone (e.g., an aerial drone, ground-based drone, etc.). In some implementations, the delivery system can transfer a delivery package to a delivery/transfer drone while the vehicle is stationary or in motion (e.g., traveling to a destination, etc.). For example, in some implementations, a delivery service pod can comprise a package handling unit which can provide for obtaining a delivery package from the delivery service pod and transfer the delivery package to a delivery/transfer drone, for example, to transport the delivery package to another location (e.g., a recipient, a final destination, a different delivery carrier, etc.). In some implementations, a package handling unit can provide for obtaining a delivery package from a delivery drone and storing the package within a delivery service pod as well as transferring a delivery package from a delivery service pod to a delivery/transfer drone.

As one example, in some implementations, a delivery drone (e.g., an aerial drone, etc.) can approach and land on or hover proximate to a vehicle comprising a delivery service pod. A package can be transferred from the delivery drone to the delivery service pod. Upon nearing or arriving at a package destination (e.g., recipient location, etc.), the delivery service pod can transfer the package to a transfer drone (e.g., a ground-based drone, etc.) that can move the package to the physical delivery location (e.g., complete the last leg of the delivery to the recipient, etc.).

In particular, in some implementations, a delivery service pod associated with a vehicle can include a landing panel unit located on the rooftop of the delivery service pod that provides for interaction between a delivery drone and the delivery service pod. For example, a landing panel unit can be located on the top of a delivery service pod toward the front of a vehicle. The landing panel unit can be deployed from the top of the delivery service pod to allow for a delivery drone to hover above and/or land on the delivery service pod to provide for transferring a delivery package between the delivery drone and the delivery service pod. In some implementations, the landing panel unit can at least partially cover the delivery drone, for example, to provide protection to the drone and/or package from environmental elements. The landing panel unit can provide for extracting a delivery package from a drone and transferring the delivery package to the conveyer within the delivery service pod, for example, in conjunction with a package handling unit. In addition, in some implementations, the landing panel unit can provide for extracting a delivery package from the delivery service pod in conjunction with a package handling unit and transferring the delivery package to a delivery drone.

In some implementations, for example where the vehicle associated with the delivery service pod is configured for bi-directional travel, a landing panel unit can be located on the top of a delivery service pod toward the center of the vehicle. The landing panel unit can be deployed from the top of the delivery service pod to allow for a delivery drone to hover above and/or land on the delivery service pod. The delivery drone can hover and/or land on either side of the panel of the landing panel unit based on the direction of travel of the vehicle. In some implementations, the landing panel unit can at least partially cover the delivery drone, for example, to provide protection to the drone and/or package from environmental elements.

In some implementations, a delivery drone can lower a package from the delivery drone to the landing panel unit without requiring the drone to land on the delivery service pod. In some implementations, a delivery drone can be configured such that a nose cone of the delivery drone can be raised to provide access to a storage space within the fuselage of the delivery drone from which a package can be extracted.

In some implementations, a delivery system associated with a vehicle can provide for transferring a delivery package from a delivery drone that is exterior to the vehicle to a recipient located in the interior passenger cabin of the vehicle. For example, a delivery system can obtain a delivery package from a delivery drone that is positioned proximate to the vehicle (e.g., via a landing panel unit and/or package handling unit). The delivery system can provide for moving the obtained package from the exterior of the vehicle to the interior of the vehicle (e.g., the passenger cabin) such that the package can be provided for retrieval by a recipient in the passenger cabin.

As an example, a vehicle rooftop delivery system can obtain a delivery package, such as hot coffee and breakfast, from a drone that has approached the vehicle indicating it has a delivery for an occupant of the vehicle (e.g., a morning commuter). The delivery system can transfer the package containing the coffee and breakfast from the exterior of the vehicle to the interior of the passenger cabin such that the recipient (the morning commuter on the way to work) can retrieve the package and enjoy their coffee and breakfast during the commute to their destination. In some implementations, the transfer of the package from the drone to the vehicle, as well as the transfer to the recipient in the passenger cabin, can occur while the vehicle is in motion (e.g., traveling to a destination).

In particular, in some implementations, a delivery system associated with a delivery service pod can comprise a dispensing unit which can provide for transferring a package from the delivery service pod to the passenger cabin of a vehicle. For example, in some implementations, the delivery system can be configured with a dispensing unit in a central location of the top of the passenger cabin. The dispensing unit can be deployed from the ceiling within the passenger cabin to allow for a recipient to retrieve the package from the dispensing unit. In an example, a delivery drone can transfer a package for a vehicle passenger to the vehicle's delivery service pod (e.g., via a landing panel unit and/or package handling unit). The delivery system can transfer the package to the dispensing unit and the dispensing unit can deploy down from the cabin ceiling such that a passenger (e.g., the package recipient) can retrieve the package from the dispensing unit while traveling in the vehicle. Alternatively, in some implementations, the delivery system can be biased toward one end of the vehicle (e.g., front of the vehicle, rear of the vehicle) and the dispensing unit can comprise a carousel system within the passenger cabin, which can rotate through a set of delivery positions within the vehicle interior to allow for retrieval of a package by a vehicle passenger.

In some implementations, a delivery service pod associated with a vehicle can include an exterior shuttle unit that provides for interaction between a delivery drone and the delivery service pod. The exterior shuttle unit can be configured on the front, rear, and/or side of the delivery service pod. The exterior shuttle unit can provide for extracting a package from a delivery drone and moving the package to a pass through area configured in the delivery service pod to transfer the package to the vehicle (e.g., to the conveyor of the delivery service pod, to the dispensing unit of the delivery service pod, and/or the like).

According to another aspect of the present disclosure, in some implementations, an automated vehicle cleaning system can be integrated with the delivery system in a vehicle. In some implementations, a vehicle cleaning system can comprise a vacuum unit and a robotic manipulator that can be integrated within a central cavity of the rooftop delivery service pod of the delivery system. The robotic manipulator of the vehicle cleaning system can be deployed from the central cavity of the rooftop delivery service pod such that it can perform routine cleaning of the vehicle interior (e.g., after the completion of a service trip, etc.). For example, the vehicle cleaning system can provide for determining when a vehicle interior deviates from an established standard or when objects have been left behind in the vehicle and allow for collection of objects, cleaning and/or sanitizing of exposed interior areas and/or surfaces, and/or the like, through the use of the robotic manipulator. In some implementations, a vehicle cleaning system can determine and/or receive an indication that a service trip has been completed (e.g., passengers have exited the vehicle at the destination, etc.) and the vehicle cleaning system can then initiate a cleaning routine (e.g., for the interior of the passenger cabin, etc.). The central cavity of the rooftop delivery service pod can be configured such that the cavity is covered and secured when the cleaning system robotic manipulator is stowed, such that the robotic manipulator is isolated from riders within the vehicle.

In some implementations, the robotic manipulator can include a robotic arm comprised of multiple arm segments and joints (e.g., rotary joints, etc.) to allow the robotic manipulator to access all of the exposed surfaces and/or areas within the vehicle interior that may need to be cleaned after a service trip is completed. For example, in some implementations, the robotic manipulator can be configured with a plurality of adjacent arm segments and joints based on the location of the robotic manipulator within the vehicle to provide desired degrees of freedom (e.g., five degrees of freedom, seven degrees of freedom, etc.) to allow the robotic manipulator access to all the areas and/or surfaces to be cleaned. The robotic manipulator can be configured to identify and collect personal items left in the vehicle by a user (e.g., user objects), to collect and remove refuse objects (e.g. trash) left in the vehicle, and to clean areas and/or surfaces of the vehicle interior, including vacuuming debris and/or sanitizing the areas and/or surfaces. In some implementations, the robotic manipulator can be further configured to manipulate components of the vehicle, such as closing compartments, doors, and/or the like.

In some implementations, the multiple adjacent arm segments and joints of the arm of the robotic manipulator can have a hollow configuration, such as by defining one or more cavities, channels, etc., to provide for routing a vacuum path through the arm of the robotic manipulator (e.g., in flow communication with a vacuum unit), as well as separate power and/or data cable paths through the robotic manipulator arm. For instance, the arm segments/joints may define a hollow vacuum channel for providing a vacuum path through the arm and one or more additional hollow channels for routing power cables, data cables, and/or the like through the robotic manipulator arm. The robotic manipulator can further comprise a gripper unit disposed at a distal end of the arm that can be configured to collect user objects and/or refuse objects as well as provide a vacuum nozzle for the cleaning system (e.g., in flow communication with the vacuum path through the arm). In some implementations, the gripper unit can further comprise a means for sanitizing and/or sterilizing areas of the vehicle interior, such as through the use of ultraviolet light. In some implementations, the robotic manipulator can include one or more sensors, such as a camera, etc., that can be used to inspect the vehicle interior and identify objects left behind to be collected (e.g., user objects, refuse objects, etc.) and/or identify areas that need to be cleaned.

According to an aspect of the present disclosure, the automated cleaning system can operate in a largely autonomous mode, for example, by performing one or more defined cleaning routines within fixed areas of the vehicle interior. In some implementations, the automated cleaning system can highlight an area to be cleaned and obtain and execute a motion path to perform the cleaning of that area. For example, in some implementations, one or more sensors can be used to inspect each area of the vehicle interior to identify if any objects were left in the vehicle that should be collected (e.g., user objects, refuse objects, etc.) and/or identify if an area needs to be cleaned (e.g., vacuumed and/or sanitized, etc.), such as after the completion of a vehicle service, for example. The automated cleaning system can then implement one or more appropriate motion paths to allow the robotic manipulator to access the designated area and perform the necessary actions.

As an example, in some implementations, the one or more sensors (e.g., camera, etc.) can be used to identify personal items (e.g., user objects) that may have been left behind in the vehicle by a user. The robotic manipulator can be used to collect the object(s) (e.g., using the gripper end) and deposit the object(s) into a collection receptacle within the vehicle where it can be stored until it can be returned to the user. For example, one or more collection receptacles can be configured within the vehicle for the storage of user objects and the robotic manipulator can place a collected user object into one of the collection receptacles (e.g., after completion of a service trip, etc.) such that the user object can be securely stored until the user object can be returned to or retrieved by the user. Additionally, in some implementations, the robotic manipulator can be further configured to provide for handling objects within the vehicle (e.g., packages to be delivered to a recipient external to the vehicle, recovered user objects to be returned to a prior passenger, etc.) and extending outside the vehicle to allow a recipient external to the vehicle to retrieve the object.

In another example, the automated cleaning system can identify larger debris (e.g., refuse objects such as containers, papers, etc.) left in the vehicle (e.g., via one or more sensors, etc.) and deploy the robotic manipulator to collect the larger debris and deposit it into a collection receptacle configured for storage of refuse objects within the vehicle to be held until it can be removed, for example, during a vehicle service. Additionally, in some implementations, the automated cleaning system can be configured to allow the robotic manipulator to collect larger debris and deposit the debris at a location external to the vehicle (e.g., a refuse container at the roadside, a collection point at a service location, etc.).

The systems and methods described herein provide a number of technical effects and benefits. For instance, the systems and methods described herein can provide for an automated delivery system that can allow for improved trip efficiency by allowing for understanding of travel patterns to align deliveries to coincide with passenger travel routes and/or times, thereby optimizing the distance traveled by a vehicle. The systems and methods described herein can also provide technical effects and benefits of allowing for buffering deliveries to coincide with non-peak passenger travel time such that the in-service time of a vehicle can be maximized.

Additionally, the systems and methods described herein provide the technical effect and benefit of providing separation between a delivery unit and a passenger cabin, such that delivery contents can be isolated from passengers, thereby limiting potential irritation of passengers within the vehicle.

With reference to the figures, example embodiments of the present disclosure will be discussed in further detail.

FIG. 1 depicts an example of an autonomous vehicle 100 with an integrated delivery system according to example embodiments of the present disclosure. As described herein, an automated delivery system can be integrated into a vehicle, such as an autonomous vehicle, that is also configured to provide passenger services. As illustrated in FIG. 1, an autonomous vehicle 100 can comprise a passenger cabin 102 and a delivery service pod 104 that is integrated into the roof space of the vehicle 100. The delivery service pod 104 can be configured to optimize the space required for the delivery service pod 104 such that it has minimal or no impact on the usable space in the passenger cabin 102 of the vehicle 100.

In some implementations, the delivery system can be configured such that the delivery service pod 104 is configured as a separate compartment from the passenger cabin 102 of the vehicle 100, thereby isolating the delivery contents from passengers within the vehicle. By isolating deliveries from the passenger cabin air, passenger irritation from delivery odors and the like can be minimized or eliminated.

Figure 2:
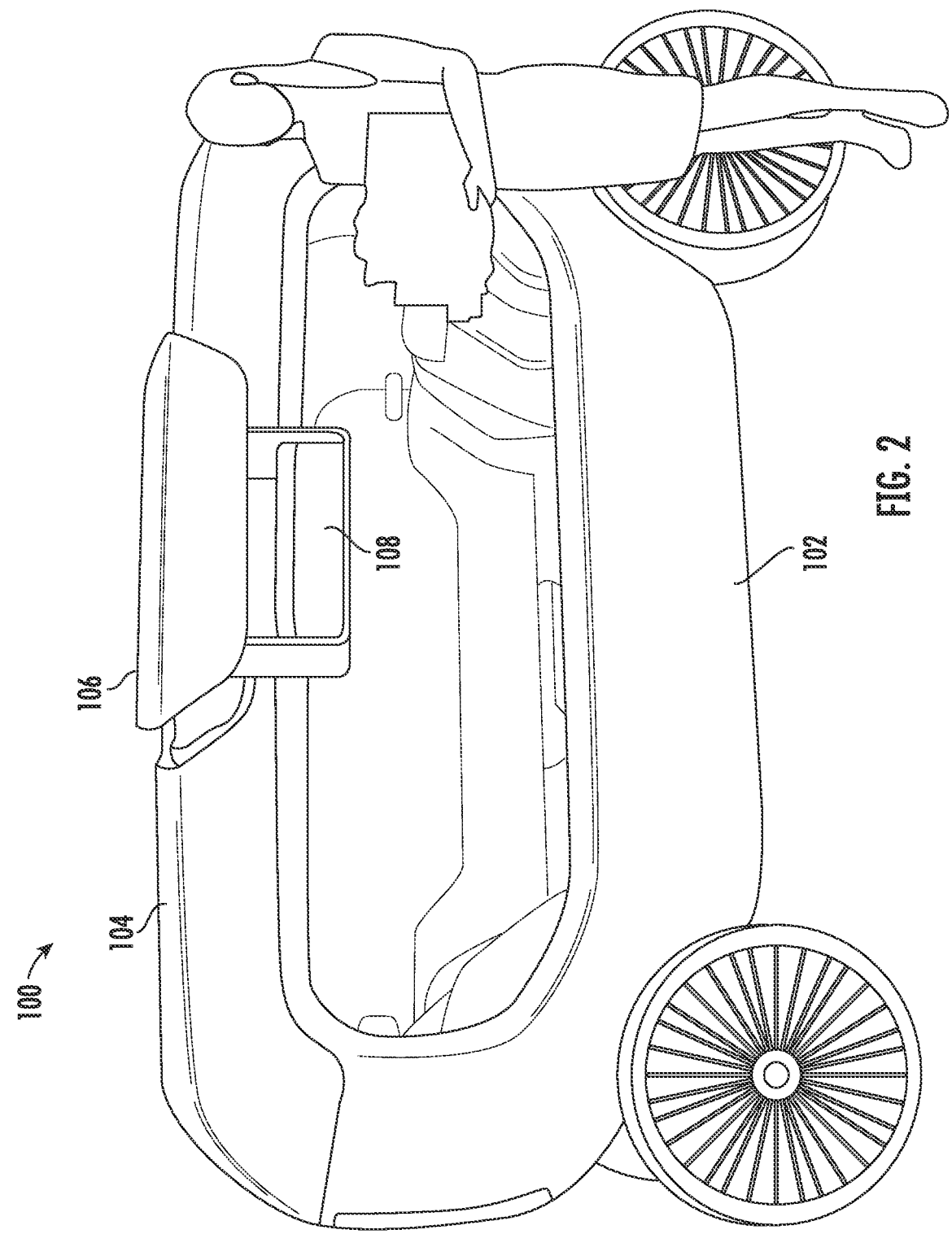
FIG. 2 depicts an example of an autonomous vehicle with an integrated delivery system according to example embodiments of the present disclosure.

FIG. 2 depicts another example of the autonomous vehicle 100 with an integrated delivery system according to example embodiments of the present disclosure. As illustrated in FIG. 2, a delivery service pod 104 integrated into an autonomous vehicle 100 can comprise an access unit 106 to provide access to a delivery crate 108 containing a delivery package for a recipient to retrieve from the exterior of the vehicle 100. For example, in some implementations, an automated delivery system can provide for notification of a pending delivery to a recipient, for example, through an application running on a user computing device (e.g., smartphone, tablet, computer, etc.). The automated delivery system can provide secure access for retrieval of the delivery by the recipient. For example, a recipient (e.g., delivery application user, etc.) can receive a notification via an application (e.g. delivery service application, etc.) on their user computing device that a vehicle 100 has arrived or will be arriving soon at the recipient's location with a delivery for the recipient. The recipient can then proceed to the vehicle 100 and request to retrieve the delivery, for example, by scanning or entering an identification code (e.g., via the application, via an interface associated with the vehicle, etc.). Upon confirmation of the identification code, the vehicle 100 can provide the recipient with access (e.g., via access unit 106) to the delivery crate 108 associated with the recipient's delivery. In some implementations, the access unit 106 can comprise an actuator for transferring the delivery crate from a conveyor holding position to a retrieval position associated with an access door, panel, hatch, and/or the like of the access unit 106 that provides for moving the delivery crate to a position such that the delivery crate can be accessed from the exterior of the vehicle.

In some implementations, before or upon arrival at the recipient's location, the delivery system can cause the delivery crate 108 associated with the recipient to be moved in the delivery service pod 104 to a point or location associated with the access unit 106 (e.g., by rotating a carousel-style or looped conveyor within the delivery service pod 104 to align a holding position of the identified delivery crate 108 to an access door, panel, hatch, and/or the like of the access unit 106 within the exterior wall of the delivery service pod 104). Upon confirmation that the recipient's identification has been verified, the delivery system can cause the access door, panel, hatch, and/or the like of the access unit 106 within the delivery service pod 104 to be released and/or opened to provide access to the delivery crate 108 containing the delivery package(s) for the recipient from the exterior of the vehicle 100. In some implementations, the delivery service pod 104 can include an actuator associated with the access unit 106 that causes the assigned delivery crate 108 to be moved or shifted out of the delivery service pod 104 (e.g., extended outward from a delivery pod carousel holding position, etc.) to provide for convenient access and retrieval by the recipient. In some implementations, the delivery system can verify that the recipient has removed the delivery crate 108 (e.g., by monitoring the status of the delivery crate holding position and/or access unit 106, by monitoring the movement of the recipient, by receiving a confirmation from the recipient, etc.) and then cause the delivery service pod access unit 106 to be closed and/or secured.

Figure 3B:
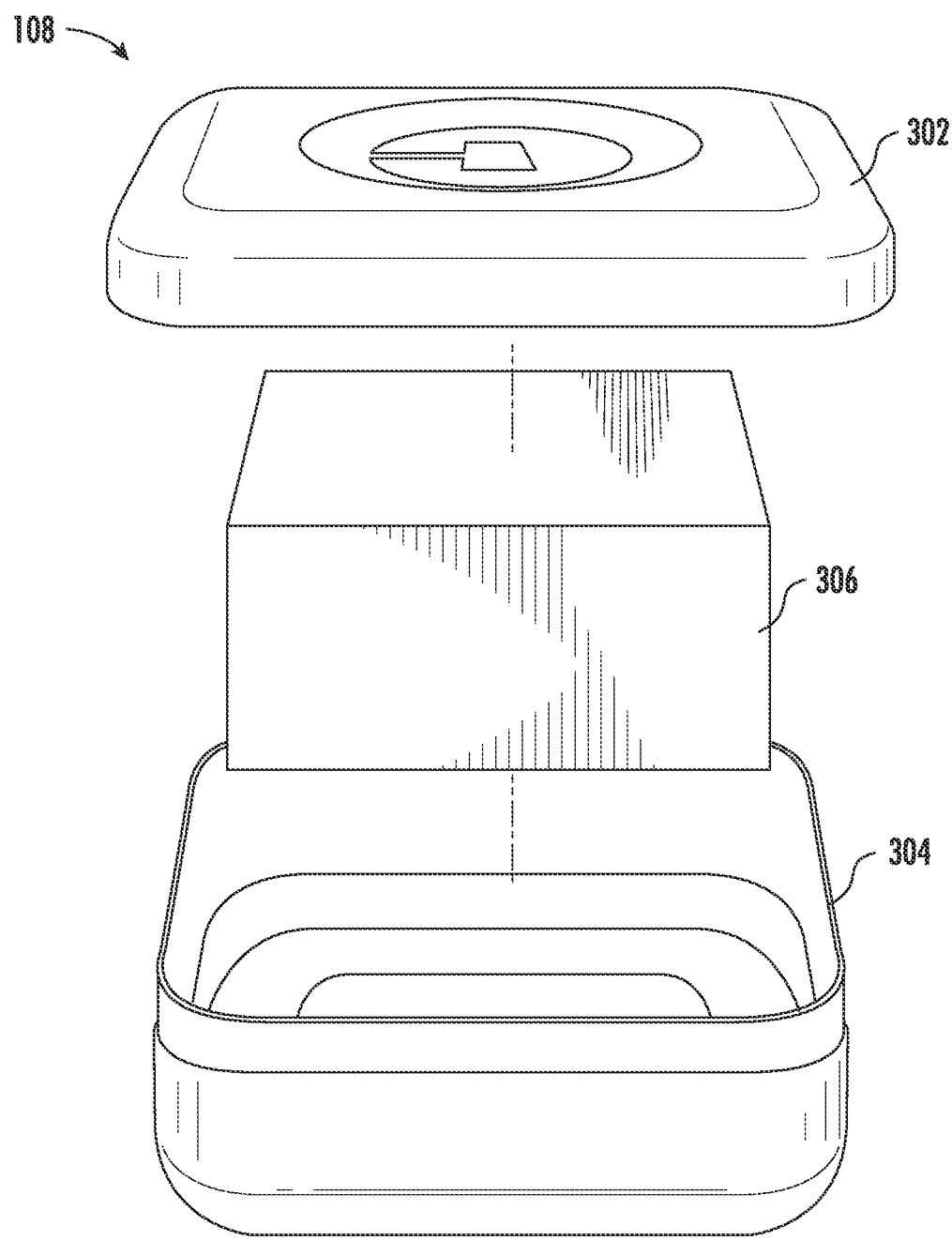

FIGS. 3A-3B depict example delivery crates 108 according to example embodiments of the present disclosure. In some implementations, an automated delivery system can include a system of delivery crates designed to securely hold a set of packages, containers, and/or the like that make up a distinct delivery unit (e.g., a delivery for a single recipient). For example, as illustrated in FIG. 3A, delivery crates, such as delivery crates 108a-108c, can be sized (e.g., 16.5"× 16.5"×7", etc.) to accommodate a range of typical delivery package sizes. For example, a delivery crate can be configured in a size to hold a certain number of beverage containers (e.g., 3 two-liter bottles, etc.) as illustrated by delivery crate 108a, one or more food containers (e.g., three extra-large pizza boxes, multiple food take out containers, etc.) as illustrated by delivery crate 108c, standard mailing packages (e.g., large flat rate shipping boxes, etc.) as illustrated by delivery crate 108b, and/or the like. In some implementations, the delivery crates 108a-108c can be constructed to provide thermal stability for the contents (e.g., help maintain cold/warm temperature of the contents, etc.), such as through the use of insulated construction materials and/or the like.

As illustrated in FIG. 3B, a delivery crate 108 can comprise a top portion 302 and a bottom portion 304 that can be separated to allow for a delivery package 306 to be placed securely within the delivery crate 108. In some implementations, the delivery crate 108 may be constructed with durable insulating materials that can be cleaned and sanitized to allow for reuse of the delivery crate 108. For example, in some implementations, the delivery system can be configured such that a recipient can remove a delivery crate 108 containing their assigned delivery from the delivery pod, remove the contents of the delivery crate 108, and reinsert the now empty delivery crate 108 into the same position within the delivery pod from which the delivery crate 108 was removed. Additionally or alternatively, in some implementations, a recipient can remove a delivery crate 108 containing their assigned delivery from the delivery pod and take the delivery crate 108 with them, returning the delivery crate 108 at a later time (e.g., to another delivery vehicle upon requesting return, at a drop off location, etc.). In some such implementations, a monetary fee may be assessed to a recipient for the delivery crate 108 if the delivery crate 108 is not returned within a specified time period after delivery. In some implementations, the delivery crate 108 may be configured to be disposable and/or recyclable, such that a recipient need not return the delivery crate 108 to the service provider.

Figure 4:
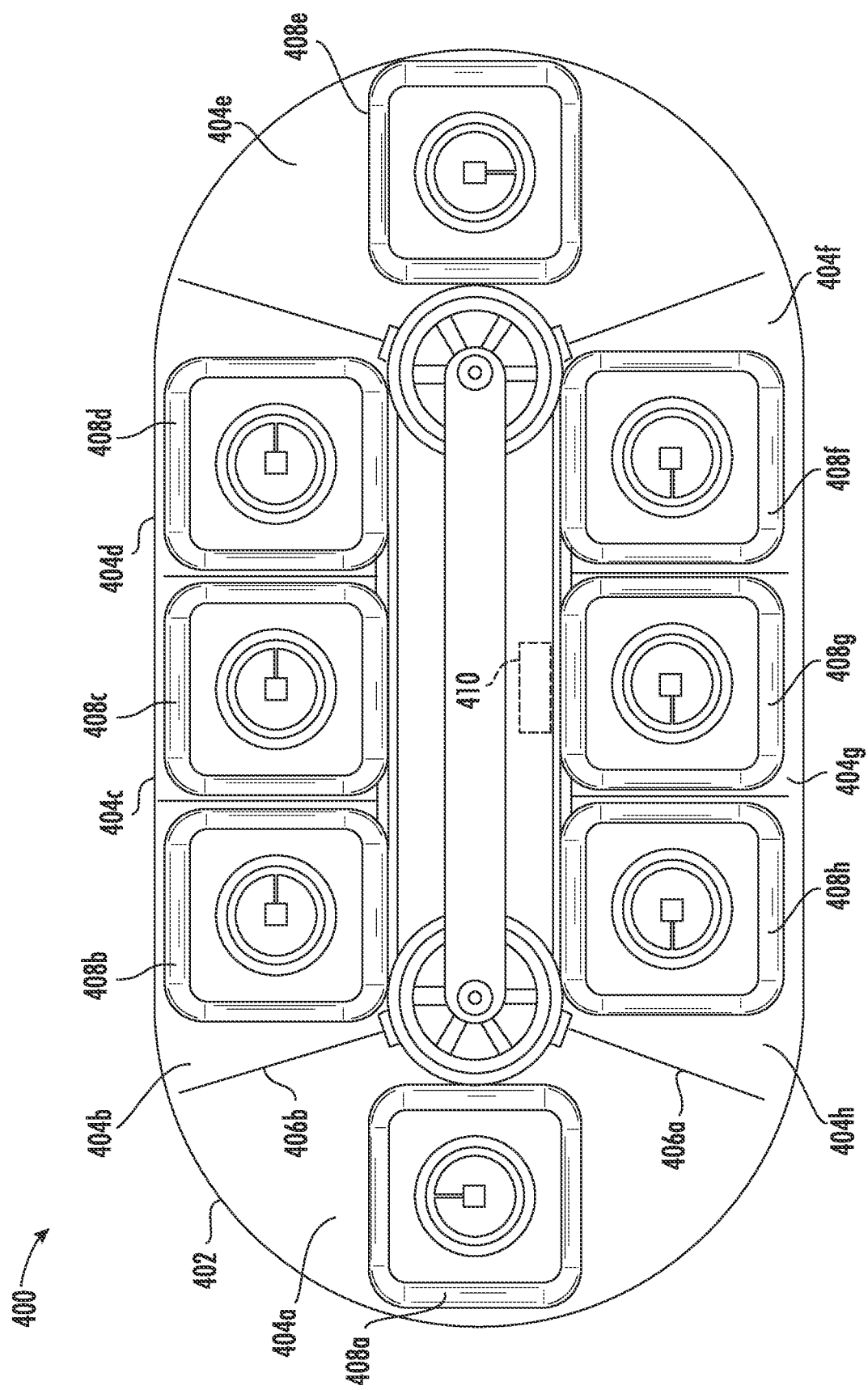
FIG. 4 depicts a top view of an example conveyor unit that can be included in a delivery pod according to example embodiments of the present disclosure.

FIG. 4 depicts a top view 400 of an example carousel-style or looped conveyor that can be included in a delivery service pod according to example embodiments of the present disclosure. In some implementations, a delivery service pod can comprise a conveyor unit including a belt driven, carousel-style or looped conveyor, such as conveyor 402, which can provide for optimizing access and handling for a plurality of delivery crates, such as delivery crates 408a-408h, which may be contained within the delivery service pod at any one time. In some implementations, the conveyor 402 can include defined positions 404a-404h for a plurality of delivery crates, for instance, using a series of sidewalls or divider walls associated with the conveyor 402, for example divider walls 406a-406b, that define isolated spaces to securely and separately hold each delivery crate relative to the conveyor 402. In some implementations, the series of sidewalls or divider walls associated with the conveyor 402 can provide for ensuring that only a designated delivery crate for a recipient (e.g., a delivery crate currently in a retrieval position within the delivery service pod) can be accessed by the recipient (e.g., preventing a recipient from accessing adjacent holding positions when retrieving their designated delivery crate).

In some implementations, the delivery service pod can comprise an actuator unit 410 associated with the conveyor 402 and an access unit (not shown). The delivery service pod can operate the actuator unit 410 to cause a delivery crate to be moved or shifted from the delivery service pod (e.g., in association with the access unit, etc.) to provide for convenient access and retrieval of the delivery crate by a recipient exterior to the vehicle.

Figure 5:
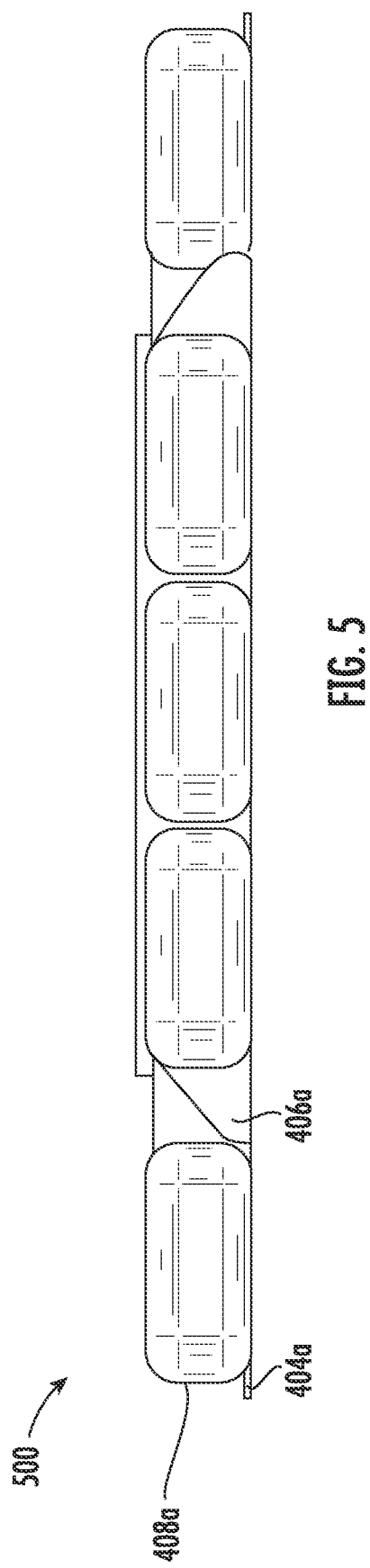
FIG. 5 depicts a side view of an example conveyor unit that can be included in a delivery pod according to example embodiments of the present disclosure.

FIG. 5 depicts a side view 500 of an example carousel-style or looped conveyor 402 that can be included in a delivery pod according to example embodiments of the present disclosure. As further illustrated in the side view 500 of FIG. 5, the carousel 402 provides a plurality of holding positions, such as holding position 404a, for delivery crates, such as delivery crate 408a, wherein the holding positions are defined by a plurality of neighboring sidewalls or dividers such as divider wall 406a.

Figure 6:
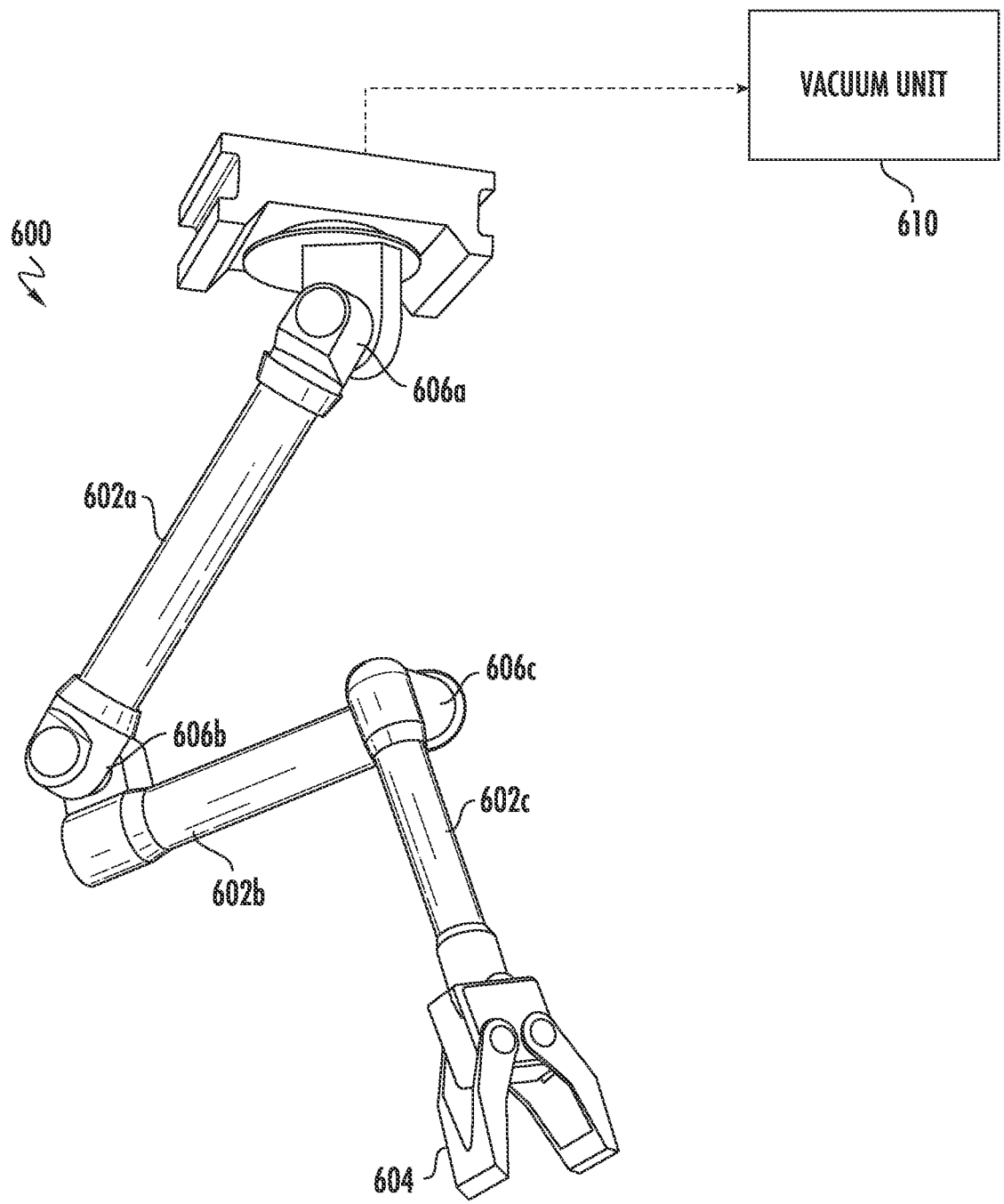
FIG. 6 depicts a robotic manipulator for an automated cleaning system that can be integrated into the rooftop of a vehicle according to example embodiments of the present disclosure.

FIG. 6 depicts a robotic manipulator 600 for an automated cleaning system that can be integrated into the rooftop of a vehicle (e.g., into a rooftop delivery system) according to example embodiments of the present disclosure. In some implementations, an automated cleaning system can be associated with the delivery system as described herein. The automated cleaning system can provide for automated cleaning of vehicles, such as autonomous vehicles, on an ongoing basis to provide for a clean and pleasant trip for each user of a vehicle. For example, in some implementations, an automated cleaning system can facilitate determining when a vehicle interior deviates from an established standard or when objects have been left behind in the vehicle and allow for collection of objects, cleaning and/or sanitizing of interior surfaces, and/or the like, for example, through the use of a robotic manipulator integrated within the interior of the vehicle. In some implementations, an automated cleaning system can allow for cleaning a vehicle after each service trip thereby ensuring that each user is presented with a vehicle interior that meets a desired standard for cleanliness.

In some implementations, an automated cleaning system can comprise a robotic manipulator configured to be integrated into the rooftop of a vehicle and to access exposed areas and/or surfaces within the interior of the vehicle (e.g., the passenger cabin). As illustrated in FIG. 6, a robotic manipulator 600 can comprise multiple adjacent arm segments 602a-602c and rotary joints 606a-606c to allow the robotic manipulator 600 to access all the exposed surfaces and/or areas within a vehicle interior that may need to be cleaned, for example, after a service trip is completed. For example, in some implementations, the robotic manipulator 600 can be configured with a plurality of adjacent arm segments and joints based on the location of the robotic manipulator within the vehicle to provide desired degrees of freedom (e.g., five degrees of freedom, seven degrees of freedom, etc.), thereby allowing the robotic manipulator access to all the areas and/or surfaces to be cleaned. The robotic manipulator 600 can be configured to identify and collect personal items left in the vehicle by a user (e.g., user objects), to collect and remove refuse objects (e.g., trash), and to clean exposed surfaces and/or areas of the vehicle interior, including vacuuming debris and/or sanitizing the surfaces/areas. In some implementations, the robotic manipulator 600 can be further configured to manipulate components of the vehicle, such as closing compartments, doors, and/or the like.

Figure 8:
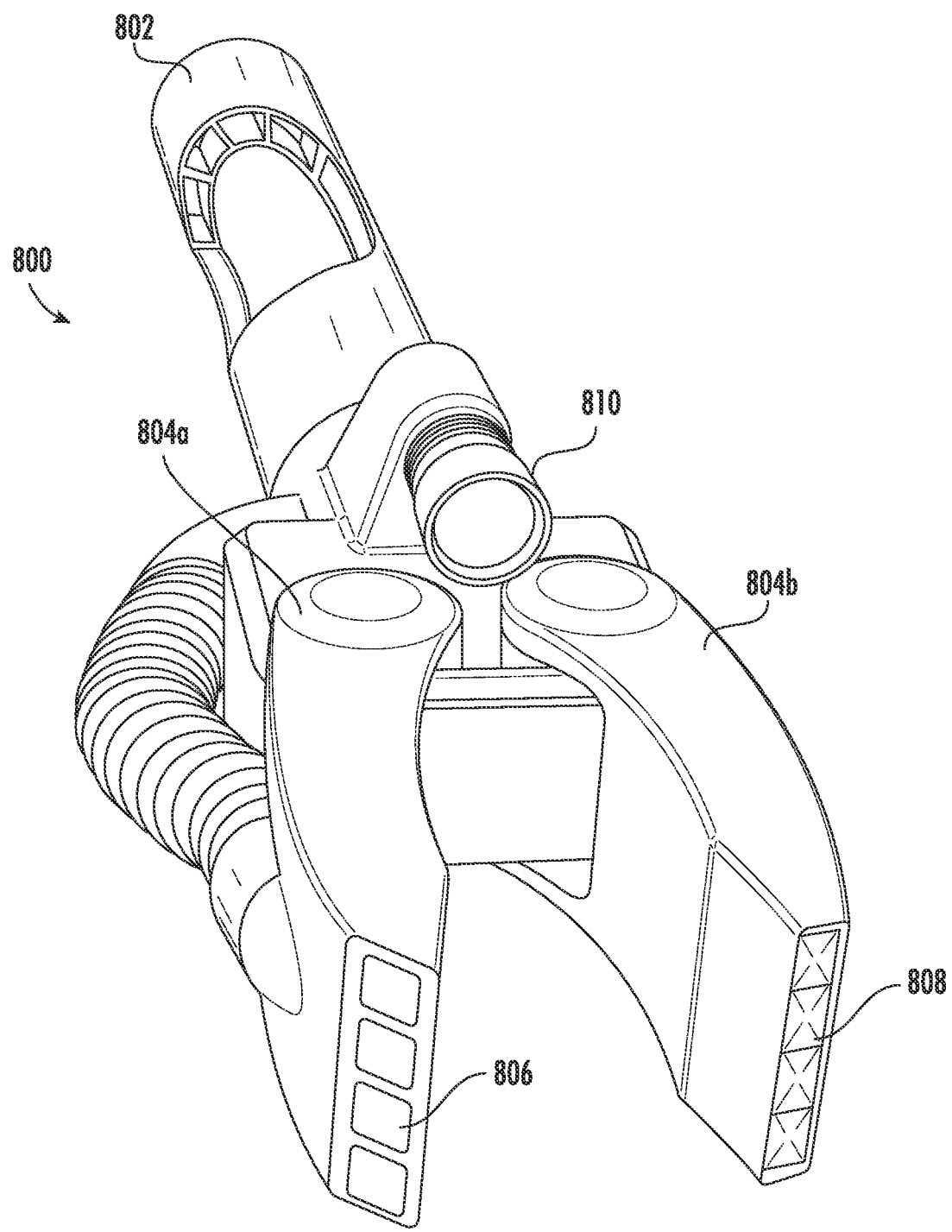
FIG. 8 depicts a gripper end of a robotic manipulator according to example embodiments of the present disclosure.

The robotic manipulator 600 further comprises a gripper unit 604 disposed at a distal end of the robotic manipulator arm that can be configured to collet objects (user objects, refuse objects, etc.) as well as provide a vacuum nozzle for the automated cleaning system (as further described in regard to FIG. 8). In some implementations, the gripper unit 604 can comprise a first portion and a second portion that can be configured to grasp objects (e.g., refuse objects, user objects left in a vehicle, etc.) and provide for depositing the objects into one or more collection receptacles, for example. The gripper unit 604 can provide a vacuum nozzle for the cleaning system to collect small debris (e.g., in flow communication with a vacuum path through the robotic manipulator arm). The robotic manipulator 600 can be connected to a vacuum unit 610 to provide for collecting small debris via the vacuum nozzle. In some implementations, the gripper unit 604 can comprise a sanitizing unit that can provide for sanitizing and/or sterilizing surfaces of the vehicle interior, such as through the use of ultraviolet light. In some implementations, the robotic manipulator 600 can comprise one or more sensors (e.g., camera, etc.), for example associated with the gripper unit 604, that can be used to assist in inspecting the vehicle interior and/or identifying objects left behind and/or surfaces/areas that need to be cleaned, that can be used to assist in controlling motion of the robotic manipulator 600 and/or the gripper unit 604, and/or the like.

Figure 7:
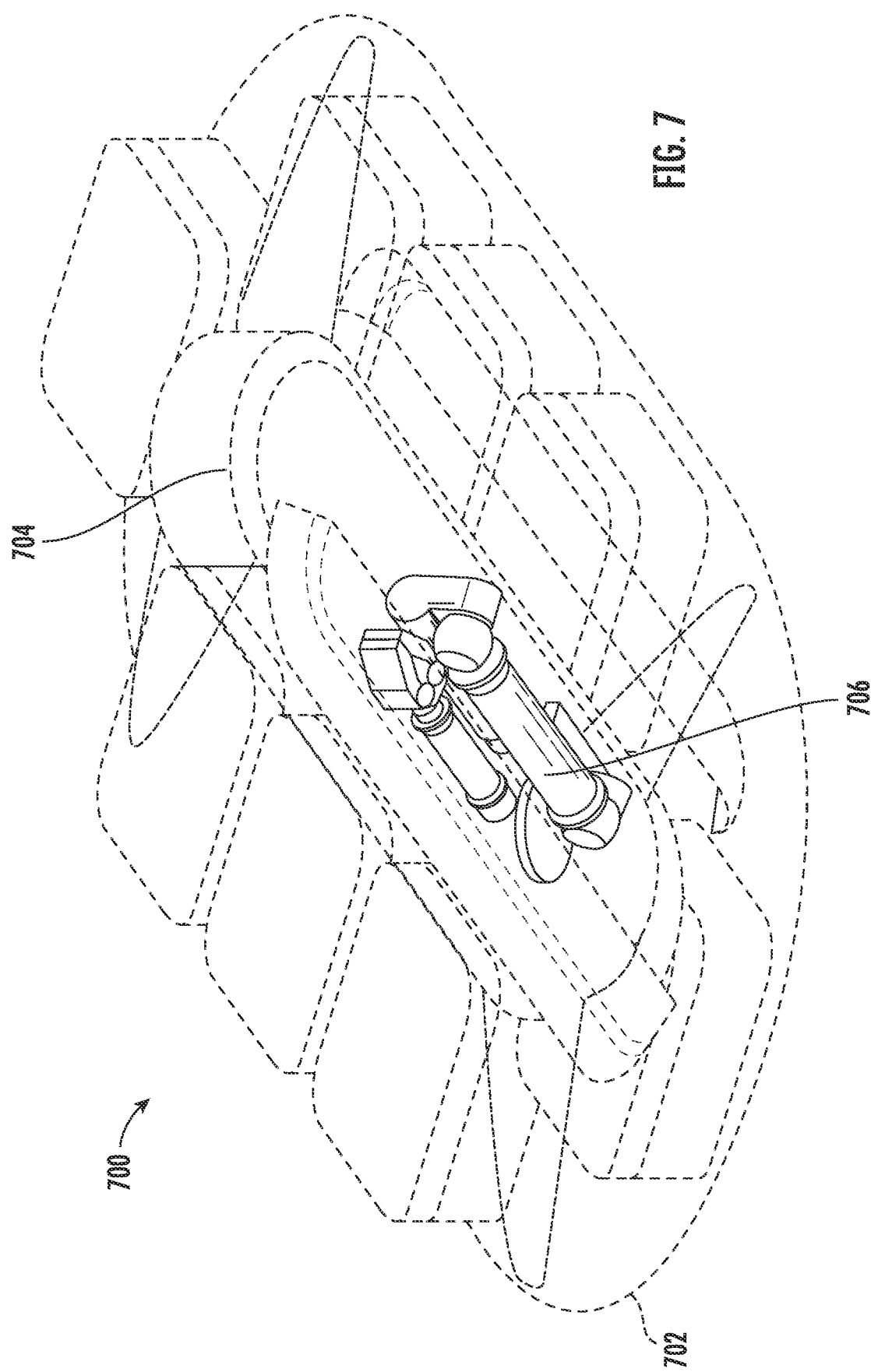
FIG. 7 depicts a rooftop configuration of a robotic manipulator for an automated cleaning system integrated into a delivery pod according to example embodiments of the present disclosure.

FIG. 7 depicts a rooftop configuration of a robotic manipulator 706 for an automated cleaning system integrated into a rooftop delivery pod 700 according to example embodiments of the present disclosure. In some implementations, a robotic manipulator (e.g., robotic manipulator 706) can be integrated within a central cavity of a rooftop delivery pod (e.g., rooftop delivery pod 700). As illustrated in FIG. 7, a rooftop delivery pod 700 can comprise a carousel-style or looped conveyor 702 for handling delivery packages (as discussed herein). The central portion of the rooftop delivery pod 700 can comprise a central cavity 704 configured for the robotic manipulator 706 of an automated cleaning system. The central cavity 704 can provide access to the interior of the vehicle and allow for the robotic manipulator 706 to be deployed from the ceiling of the vehicle interior. The robotic manipulator 706 can be configured to access all of the exposed surfaces and/or areas within a vehicle interior to perform cleaning operations and/or the like. The central cavity 704 of the rooftop delivery pod 700 can be configured such that the central cavity 704 is covered and/or secured when the robotic manipulator 706 is stowed, such that it is isolated from riders within the vehicle.

FIG. 8 depicts an example gripper unit 800 of a robotic manipulator (e.g., robotic manipulator 600 of FIG. 6) according to example embodiments of the present disclosure. As illustrated in FIG. 8, a robotic manipulator of an automated cleaning system (e.g., robotic manipulator 600, etc.) can comprise a gripper unit 800 disposed at a distal end of the robotic manipulator arm 802 that can be configured to collet objects (e.g., user objects, refuse objects, etc.) as well as provide a vacuum nozzle 806 for the cleaning system. The gripper unit 800 can comprise a first portion 804a and a second portion 804b that can be configured to grasp objects (e.g., refuse objects, user objects left in a vehicle, etc.) and provide for depositing the objects into one or more collection receptacles. The end of the first portion 804a of the gripper unit 800 comprises a vacuum nozzle 806 for the cleaning system to collect small debris. The vacuum nozzle 806 can be in flow communication with a vacuum path through the robotic manipulator arm connected to a vacuum unit). The gripper unit 800 further comprises a sanitizing unit 808 located at the end of the second portion 804b of the gripper unit 800, that can provide for sanitizing and/or sterilizing surfaces of the vehicle interior, such as through the use of ultraviolet light.

The robotic manipulator can include one or more sensors 810, such as a camera, etc., associated with the gripper unit 800 that can be used to assist in inspecting the vehicle interior, assist in identifying objects left behind and/or areas that need to be cleaned, assist in controlling motion of the robotic manipulator and/or the gripper unit 800, and/or the like. As an example, in some implementations, the one or more sensors 810 (e.g., camera, etc.) can assist in identifying objects that may have been left behind in the vehicle by a user. The robotic manipulator can be used to collect the object (e.g., using the gripper end 800) and deposit the object into a collection receptacle within the vehicle where it can be stored until it can be returned to the user and/or discarded as appropriate.

Figure 9:
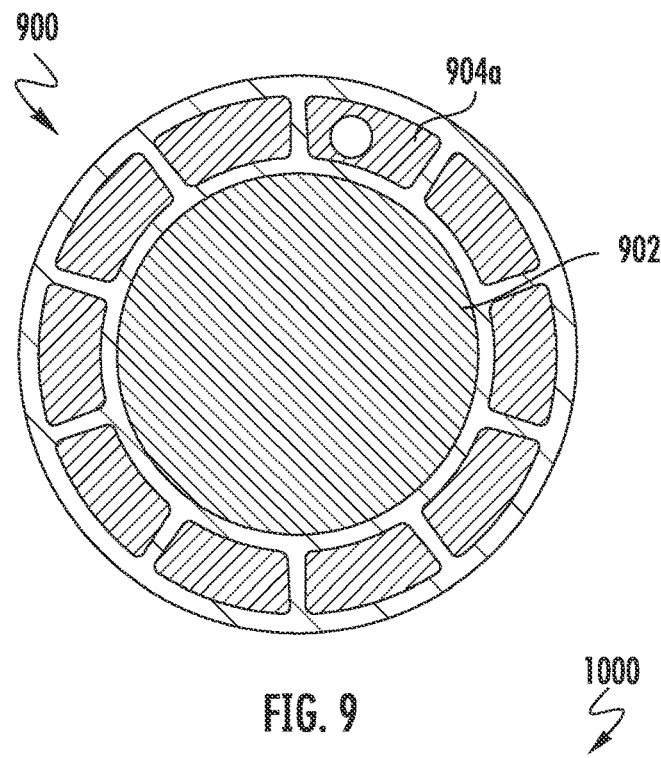
FIG. 9 depicts a cross section of the arm of a robotic manipulator according to example embodiments of the present disclosure.

FIG. 9 depicts a cross section 900 of the arm of a robotic manipulator according to example embodiments of the present disclosure. As illustrated in FIG. 9, the multiple arm adjacent segments and joints of the arm of the robotic manipulator (e.g., as illustrated in FIG. 6) can have a hollow configuration, such as by defining one or more cavities, channels, etc., to provide for routing a vacuum path through the arm of the robotic manipulator, as well as separate power and/or data cable paths through the robotic manipulator arm. For instance, the arm segments/joints may define a hollow vacuum channel 902 for providing a vacuum path through the arm and one or more additional hollow channels, such as hollow channel 904a, for routing power cables, data cables, and/or the like through the robotic manipulator arm. The hollow vacuum channel 902 can provide a vacuum path in flow communication with a vacuum unit of the automated cleaning system.

Figure 10:
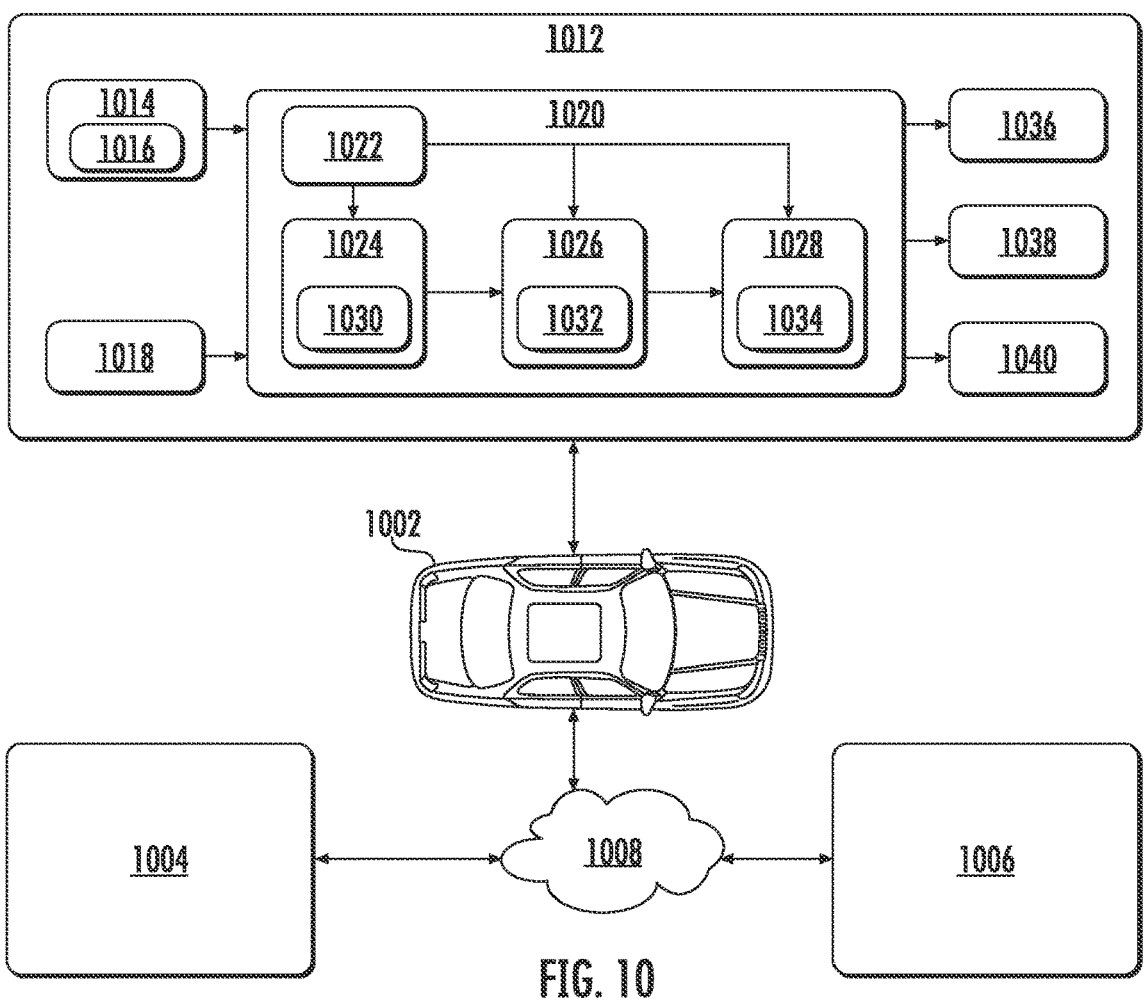
FIG. 10 depicts a block diagram of an example system for controlling the navigation of an autonomous vehicle according to example embodiments of the present disclosure.

FIG. 10 depicts a block diagram of an example system 1000 for controlling the navigation of a vehicle according to example embodiments of the present disclosure. As illustrated, FIG. 10 shows a system 1000 that includes a vehicle 1002; an operations computing system 1004; one or more remote computing devices 1006; a communication network 1008; a vehicle computing system 1012; one or more autonomy system sensors 1014; autonomy system sensor data 1016; a positioning system 1018; an autonomy computing system 1020; map data 1022; a perception system 1024; a prediction system 1026; a motion planning system 1028; state data 1030; prediction data 1032; motion plan data 1034; a communication system 1036; a vehicle control system 1038; and a human-machine interface 1040.

The operations computing system 1004 can be associated with a service provider that can provide one or more vehicle services to a plurality of users via a fleet of vehicles that includes, for example, the vehicle 1002. The vehicle services can include transportation services (e.g., rideshare services), courier services, delivery services, and/or other types of services.

The operations computing system 1004 can include multiple components for performing various operations and functions. For example, the operations computing system 1004 can include and/or otherwise be associated with the one or more computing devices that are remote from the vehicle 1002 (e.g., remote computing device 1006). The one or more computing devices of the operations computing system 1004 can include one or more processors and one or more memory devices. The one or more memory devices of the operations computing system 1004 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 1004 can be configured to monitor and communicate with the vehicle 1002 and/or its users to coordinate a vehicle service provided by the vehicle 1002. To do so, the operations computing system 1004 can manage a database that includes data including vehicle status data associated with the status of vehicles including the vehicle 1002. The vehicle status data can include a location of a vehicle (e.g., a latitude and longitude of a vehicle), the availability of a vehicle (e.g., whether a vehicle is available to pick-up or drop-off passengers and/or cargo), or the state of objects internal and/or external to a vehicle (e.g., the physical dimensions and/or appearance of objects internal/external to the vehicle).

The operations computing system 1004 can communicate with the one or more remote computing devices 1006 and/or the vehicle 1002 via one or more communications networks including the communications network 1008. The communications network 1008 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 1008 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 1002.

Each of the one or more remote computing devices 1006 can include one or more processors and one or more memory devices. The one or more memory devices can be used to store instructions that when executed by the one or more processors of the one or more remote computing devise 1006 cause the one or more processors to perform operations and/or functions including operations and/or functions associated with the vehicle 1002 including exchanging (e.g., sending and/or receiving) data or signals with the vehicle 1002, monitoring the state of the vehicle 1002, and/or controlling the vehicle 1002. The one or more remote computing devices 1006 can communicate (e.g., exchange data and/or signals) with one or more devices including the operations computing system 1004 and the vehicle 1002 via the communications network 1008. For example, the one or more remote computing devices 1006 can request the location of the vehicle 1002 via the communications network 1008.

The one or more remote computing devices 1006 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 1004). Further, the one or more remote computing devices 1006 can be used to determine and/or modify one or more states of the vehicle 1002 including a location (e.g., a latitude and longitude), a velocity, acceleration, a trajectory, and/or a path of the vehicle 1002 based in part on signals or data exchanged with the vehicle 1002. In some implementations, the operations computing system 1004 can include the one or more remote computing devices 1006.

The vehicle 1002 can be a ground-based vehicle (e.g., an automobile), an aircraft, and/or another type of vehicle. The vehicle 1002 can be an autonomous vehicle that can perform various actions including driving, navigating, and/or operating, with minimal and/or no interaction from a human driver. The autonomous vehicle 1002 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 1002 can provide driving and navigational operation with minimal and/or no interaction from a human driver present in the vehicle. A semi-autonomous operational mode can be one in which the vehicle 1002 can operate with some interaction from a human driver present in the vehicle. Park and/or sleep modes can be used between operational modes while the vehicle 1002 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 1002. Additionally, the vehicle 1002 can provide data indicative of the state of the vehicle, the state of one or more passengers of the vehicle, and/or the state of an environment to the operations computing system 1004, which can store an indication, record, and/or other data indicative of the state of the one or more objects within a predefined distance of the vehicle 1002 in one or more memory devices associated with the operations computing system 1004 (e.g., remote from the vehicle). Furthermore, the vehicle 1002 can provide data indicative of the state of the one or more objects (e.g., physical dimensions and/or appearance of the one or more objects) within a predefined distance of the vehicle 1002 to the operations computing system 1004, which can store an indication, record, and/or other data indicative of the state of the one or more objects within a predefined distance of the vehicle 1002 in one or more memory devices associated with the operations computing system 1004 (e.g., remote from the vehicle).

The vehicle 1002 can include and/or be associated with the vehicle computing system 1012. The vehicle computing system 1012 can include one or more computing devices located onboard the vehicle 1002. For example, the one or more computing devices of the vehicle computing system 1012 can be located on and/or within the vehicle 1002. The one or more computing devices of the vehicle computing system 1012 can include various components for performing various operations and functions. For instance, the one or more computing devices of the vehicle computing system 1012 can include one or more processors and one or more tangible, non-transitory, computer readable media (e.g., memory devices). The one or more tangible, non-transitory, computer readable media can store instructions that when executed by the one or more processors cause the vehicle 1002 (e.g., its computing system, one or more processors, and other devices in the vehicle 1002) to perform operations and functions, including those described herein for performing delivery services and/or other vehicle services, performing cleaning operations, and/or controlling the vehicle 1002.

As depicted in FIG. 10, the vehicle computing system 1012 can include the one or more autonomy system sensors 1014; the positioning system 1018; the autonomy computing system 1020; the communication system 1036; the vehicle control system 1038; and the human-machine interface 1040. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 1014 can be configured to generate and/or store data including the autonomy sensor data 1016 associated with one or more objects that are proximate to the vehicle 1002 (e.g., within range or a field of view of one or more of the one or more sensors 1014). The one or more autonomy system sensors 1014 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 1016 can include image data, radar data, LIDAR data, and/or other data acquired by the one or more autonomy system sensors 1014. The one or more objects can include, for example, pedestrians, vehicles, bicycles, and/or other objects. The one or more objects can be located on various parts of the vehicle 1002 including a front side, rear side, left side, right side, top, or bottom of the vehicle 1002. The autonomy sensor data 1016 can be indicative of locations associated with the one or more objects within the surrounding environment of the vehicle 1002 at one or more times. For example, autonomy sensor data 1016 can be indicative of one or more LIDAR point clouds associated with the one or more objects within the surrounding environment. The one or more autonomy system sensors 1014 can provide the autonomy sensor data 1016 to the autonomy computing system 1020.

In addition to the autonomy sensor data 1016, the autonomy computing system 1020 can retrieve or otherwise obtain data including the map data 1022. The map data 1022 can provide detailed information about the surrounding environment of the vehicle 1002. For example, the map data 1022 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 1012 in processing, analyzing, and perceiving its surrounding environment and its relationship thereto.

The vehicle computing system 1012 can include a positioning system 1018. The positioning system 1018 can determine a current position of the vehicle 1002. The positioning system 1018 can be any device or circuitry for analyzing the position of the vehicle 1002. For example, the positioning system 1018 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 1002 can be used by various systems of the vehicle computing system 1012 and/or provided to one or more remote computing devices (e.g., the operations computing system 1004 and/or the remote computing device 1006). For example, the map data 1022 can provide the vehicle 1002 relative positions of the surrounding environment of the vehicle 1002. The vehicle 1002 can identify its position within the surrounding environment (e.g., across six axes) based at least in part on the data described herein. For example, the vehicle 1002 can process the autonomy sensor data 1016 (e.g., LIDAR data, camera data) to match it to a map of the surrounding environment to get an understanding of the vehicle's position within that environment (e.g., transpose the vehicle's position within its surrounding environment).

The autonomy computing system 1020 can include a perception system 1024, a prediction system 1026, a motion planning system 1028, and/or other systems that cooperate to perceive the surrounding environment of the vehicle 1002 and determine a motion plan for controlling the motion of the vehicle 1002 accordingly. For example, the autonomy computing system 1020 can receive the autonomy sensor data 1016 from the one or more autonomy system sensors 1014, attempt to determine the state of the surrounding environment by performing various processing techniques on the autonomy sensor data 1016 (and/or other data), and generate an appropriate motion plan through the surrounding environment. The autonomy computing system 1020 can control the one or more vehicle control systems 1038 to operate the vehicle 1002 according to the motion plan.

The perception system 1024 can identify one or more objects that are proximate to the vehicle 1002 based on autonomy sensor data 1016 received from the autonomy system sensors 1014. In particular, in some implementations, the perception system 1024 can determine, for each object, state data 1030 that describes a current state of such object. As examples, the state data 1030 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 1024 can determine state data 1030 for each object over a number of iterations. In particular, the perception system 1024 can update the state data 1030 for each object at each iteration. Thus, the perception system 1024 can detect and track objects (e.g., vehicles, bicycles, pedestrians, etc.) that are proximate to the vehicle 1002 over time, and thereby produce a presentation of the world around an vehicle 1002 along with its state (e.g., a presentation of the objects of interest within a scene at the current time along with the states of the objects).

The prediction system 1026 can receive the state data 1030 from the perception system 1024 and predict one or more future locations and/or moving paths for each object based on such state data. For example, the prediction system 1026 can generate prediction data 1032 associated with each of the respective one or more objects proximate to the vehicle 1002. The prediction data 1032 can be indicative of one or more predicted future locations of each respective object. The prediction data 1032 can be indicative of a predicted path (e.g., predicted trajectory) of at least one object within the surrounding environment of the vehicle 1002. For example, the predicted path (e.g., trajectory) can indicate a path along which the respective object is predicted to travel over time (and/or the velocity at which the object is predicted to travel along the predicted path). The prediction system 1026 can provide the prediction data 1032 associated with the one or more objects to the motion planning system 1028.

The motion planning system 1028 can determine a motion plan and generate motion plan data 1034 for the vehicle 1002 based at least in part on the prediction data 1032 (and/or other data). The motion plan data 1034 can include vehicle actions with respect to the objects proximate to the vehicle 1002 as well as the predicted movements. For instance, the motion planning system 1028 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 1034. By way of example, the motion planning system 1028 can determine that the vehicle 1002 can perform a certain action (e.g., pass an object) without increasing the potential risk to the vehicle 1002 and/or violating any traffic laws (e.g., speed limits, lane boundaries, signage). The motion plan data 1034 can include a planned trajectory, velocity, acceleration, and/or other actions of the vehicle 1002.

As one example, in some implementations, the motion planning system 1028 can determine a cost function for each of one or more candidate motion plans for the autonomous vehicle 1002 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 1002 approaches impact with another object and/or deviates from a preferred pathway (e.g., a predetermined travel route).

Thus, given information about the current locations and/or predicted future locations and/or moving paths of objects, the motion planning system 1028 can determine a cost of adhering to a particular candidate pathway. The motion planning system 1028 can select or determine a motion plan for the autonomous vehicle 1002 based at least in part on the cost function(s). For example, the motion plan that minimizes the cost function can be selected or otherwise determined. The motion planning system 1028 then can provide the selected motion plan to a vehicle controller that controls one or more vehicle controls (e.g., actuators or other devices that control gas flow, steering, braking, etc.) to execute the selected motion plan.

The motion planning system 1028 can provide the motion plan data 1034 with data indicative of the vehicle actions, a planned trajectory, and/or other operating parameters to the vehicle control systems 1038 to implement the motion plan data 1034 for the vehicle 1002. For instance, the vehicle 1002 can include a mobility controller configured to translate the motion plan data 1034 into instructions. By way of example, the mobility controller can translate a determined motion plan data 1034 into instructions for controlling the vehicle 1002 including adjusting the steering of the vehicle 1002 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 1034.

The vehicle computing system 1012 can include a communications system 1036 configured to allow the vehicle computing system 1012 (and its one or more computing devices) to communicate with other computing devices. The vehicle computing system 1012 can use the communications system 1036 to communicate with the operations computing system 1004 and/or one or more other remote computing devices (e.g., the one or more remote computing devices 1006) over one or more networks (e.g., via one or more wireless signal connections, etc.). In some implementations, the communications system 1036 can allow communication among one or more of the system on-board the vehicle 1002. The communications system 1036 can also be configured to enable the autonomous vehicle 1002 to communicate with and/or provide and/or receive data and/or signals from a remote computing device 1006 associated with a user and/or an item (e.g., an item to be picked-up for a courier service). The communications system 1036 can utilize various communication technologies including, for example, radio frequency signaling, and/or Bluetooth low energy protocol. The communications system 1036 can include any suitable components for interfacing with one or more networks, including, for example, one or more: transmitters, receivers, ports, controllers, antennas, and/or other suitable components that can help facilitate communication. In some implementations, the communications system 1036 can include a plurality of components (e.g., antennas, transmitters, and/or receivers) that allow it to implement and utilize multiple-input, multiple-output (MIMO) technology and communication techniques.

The vehicle computing system 1012 can include the one or more human-machine interfaces 1040. For example, the vehicle computing system 1012 can include one or more display devices located on the vehicle computing system 1012. A display device (e.g., screen of a tablet, laptop, and/or smartphone) can be viewable by a user of the vehicle 1002 that is located in the front of the vehicle 1002 (e.g., driver's seat, front passenger seat). Additionally, or alternatively, a display device can be viewable by a user of the vehicle 1002 that is located in the rear of the vehicle 1002 (e.g., a back passenger seat).

Figure 11:
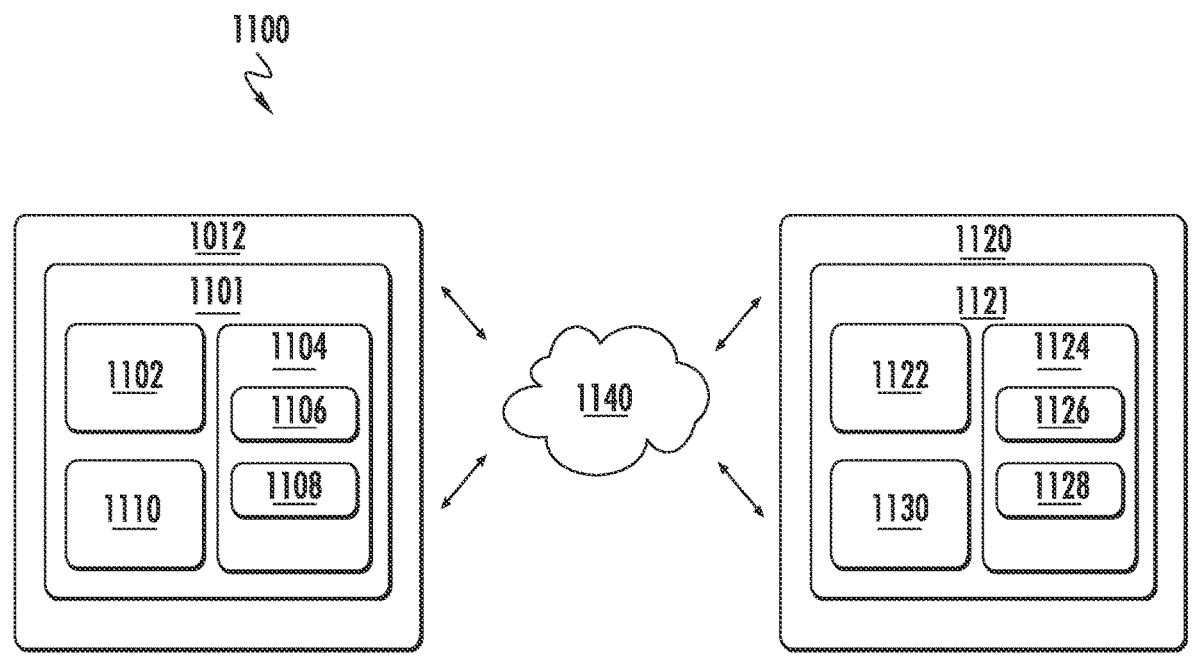
FIG. 11 depicts a block diagram of an example computing system according to example embodiments of the present disclosure.

FIG. 11 depicts a block diagram of an example computing system 1100 according to example embodiments of the present disclosure. The example system 1100 illustrated in FIG. 11 is provided as an example only. The components, systems, connections, and/or other aspects illustrated in FIG. 11 are optional and are provided as examples of what is possible, but not required, to implement the present disclosure. The example system 1100 can include the vehicle computing system 1012 of the autonomous vehicle 1002 and a remote computing system 1120 (e.g., operations computing system, other computing system, etc. that is remote from the vehicle 1002) that can be communicatively coupled to one another over one or more network(s) 1140. The remote computing system 1120 can be and/or include the operations computing system 1004 and/or remote computing system 1006 of FIG. 10. The remote computing system 1120 can be associated with a central operations system and/or an entity associated with the vehicle 1002 such as, for example, a vehicle owner, vehicle manager, fleet operator, service provider, etc. For instance, the remote computing system 1120 can be or otherwise include the operations computing system 1004 described herein.

The computing device(s) 1101 of the vehicle computing system 1012 can include processor(s) 1102 and at least one memory 1104. The one or more processors 1102 can be any suitable processing device (e.g., a processor core, a microprocessor, an ASIC, a FPGA, a controller, a microcontroller, etc.) and can be one processor or a plurality of processors that are operatively connected. The memory 1104 can include one or more non-transitory computer-readable storage media, such as RAM, ROM, EEPROM, EPROM, one or more memory devices, flash memory devices, magnetic disks, data registers, etc., and combinations thereof.

The memory 1104 can store information that can be accessed by the one or more processors 1102. For instance, the memory 1104 (e.g., one or more non-transitory computer-readable storage mediums, memory devices) can include computer-readable instructions 1106 that can be executed by the one or more processors 1102. The instructions 1106 can be software written in any suitable programming language or can be implemented in hardware. Additionally, or alternatively, the instructions 1106 can be executed in logically and/or virtually separate threads on processor(s) 1102.

For example, the memory 1104 on-board the vehicle 1002 can store instructions 1106 that when executed by the one or more processors 1102 cause the one or more processors 1102 (e.g., in the vehicle computing system 1012) to perform operations such as any of the operations and functions of the computing device(s) 1101 and/or vehicle computing system 1012, any of the operations and functions for which the vehicle computing system 1012 is configured, and/or any other operations and functions described herein.

The memory 1104 can store data 1108 that can be obtained (e.g., received, accessed, written, manipulated, created, generated, etc.) and/or stored. The data 1108 can include, for instance, services data (e.g., trip data, user data, etc.), sensor data, map data, perception data, prediction data, motion planning data, object states and/or state data, object motion trajectories, feedback data, fault data, log data, and/or other data/information as described herein. In some implementations, the computing device(s) 1101 can obtain data from one or more memories that are remote from the autonomous vehicle 1002.

The computing device(s) 1101 can also include a communication interface 1110 used to communicate with one or more other system(s) (e.g., the remote computing system 1120). The communication interface 1110 can include any circuits, components, software, etc. for communicating via one or more networks (e.g., network(s) 1140). In some implementations, the communication interface 1110 can include, for example, one or more of a communications controller, receiver, transceiver, transmitter, port, conductors, software, and/or hardware for communicating data.

The remote computing system 1120 can include one or more computing device(s) 1121. The computing device(s) 1121 can include one or more processors 1122 and at least one memory 1124. The one or more processors 1122 can be any suitable processing device (e.g., a processor core, a microprocessor, an ASIC, a FPGA, a controller, a microcontroller, etc.) and can be one processor or a plurality of processors that are operatively connected. The memory 1124 can include one or more tangible, non-transitory computer-readable storage media, such as RAM, ROM, EEPROM, EPROM, one or more memory devices, flash memory devices, data registers, etc., and combinations thereof.

The memory 1124 can store information that can be accessed by the one or more processors 1122. For instance, the memory 1124 (e.g., one or more tangible, non-transitory computer-readable storage media, one or more memory devices, etc.) can include computer-readable instructions 1126 that can be executed by the one or more processors 1122. The instructions 1126 can be software written in any suitable programming language or can be implemented in hardware. Additionally, or alternatively, the instructions 1126 can be executed in logically and/or virtually separate threads on processor(s) 1122.

For example, the memory 1124 can store instructions 1126 that when executed by the one or more processors 1122 cause the one or more processors 1122 to perform operations such as any of the operations and functions of the operations computing system 1004, the remote computing system 1006, the remote computing system 1120 and/or computing device(s) 1121 or for which any of these computing systems are configured, as described herein, and/or any other operations and functions described herein.

The memory 1124 can store data 1128 that can be obtained and/or stored. The data 1128 can include, for instance, services data (e.g., trip data, user, data etc.), data associated with autonomous vehicles (e.g., vehicle data, maintenance data, ownership data, sensor data, map data, perception data, prediction data, motion planning data, object states and/or state data, object motion trajectories, feedback data, fault data, log data, etc.), inventory data, scheduling data, log data, attribute data, scenario data, training data, and/or other data/information as described herein. In some implementations, the computing device(s) 1121 can obtain data from one or more memories that are remote from the remote computing system 1120.

The computing device(s) 1121 can also include a communication interface 1130 used to communicate with one or more other system(s) (e.g., the vehicle computing system 1012, etc.). The communication interface 1130 can include any circuits, components, software, etc. for communicating via one or more networks (e.g., network(s) 1140). In some implementations, the communication interface 1130 can include, for example, one or more of a communications controller, receiver, transceiver, transmitter, port, conductors, software, and/or hardware for communicating data.

The network(s) 1140 can be any type of network or combination of networks that allows for communication between devices. In some embodiments, the network(s) 1140 can include one or more of a local area network, wide area network, the Internet, secure network, cellular network, mesh network, peer-to-peer communication link, and/or some combination thereof, and can include any number of wired or wireless links. Communication over the network(s) 1140 can be accomplished, for instance, via a communication interface using any type of protocol, protection scheme, encoding, format, packaging, etc.

Figure 12:
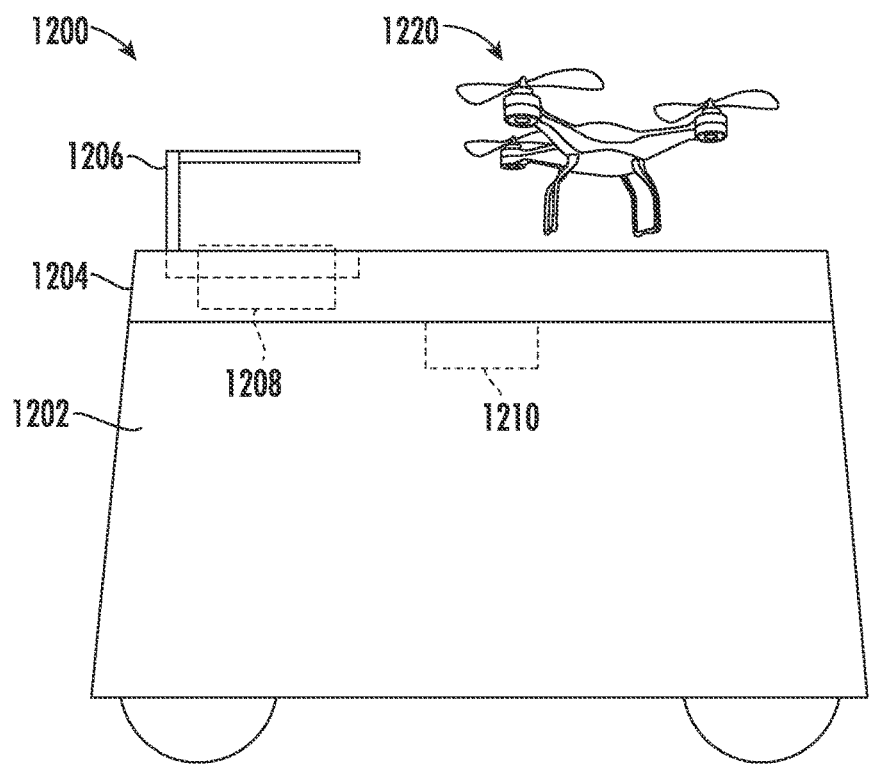
FIG. 12 depicts a block diagram of an example vehicle delivery system including a delivery drone system according to example embodiments of the present disclosure.

FIG. 12 depicts an example of an autonomous vehicle 1200 comprising an automated delivery system and a delivery drone 1220 according to example embodiments of the present disclosure. As illustrated in FIG. 12, an autonomous vehicle 1200 with an automated delivery system can provide for obtaining one or more delivery packages from a delivery drone, such as delivery drone 1220. The autonomous vehicle 1200 can comprise a delivery service pod 1204 associated with the automated delivery system. To accommodate obtaining packages from a delivery drone, such as delivery drone 1220, the delivery service pod 1204 can comprise a landing panel unit 1206 and a package handling unit 1208. In some implementations, the landing panel unit 1206 can be provided on the rooftop of the delivery service pod 1204. The landing panel unit 1206 can be configured to be deployed out of the delivery service pod 1204 to allow a delivery drone to hover proximate to and/or land on the delivery service pod 1204 and allow for transferring a delivery package between the delivery drone 1220 and the delivery service pod 1204, for example, via the package handling unit 1208. In some implementations, the landing panel unit 1206 can at least partially cover the delivery drone 1220, for example, to provide protection from environmental elements. The package handling unit 1208 can be configured to transfer a delivery package from the delivery drone 1220 to the delivery service pod 1204. The package handling unit 1208 can comprise a means for moving a delivery package, for example, a movable platform (e.g., configured to raise and lower from the delivery service pod proximate to the landing panel unit, etc.), a manipulator, and/or the like, that can receive a delivery package proximate to the landing panel unit 1206 (e.g., from a landed or hovering delivery drone exterior to the delivery service pod, etc.) and transfer the delivery package to the interior of the delivery service pod 1204 (e.g. to the delivery service pod conveyor, etc.). In some implementations, for example, where the package handling unit 1208 comprises a moveable platform and/or the like, the package handling unit 1208 can comprise an actuator to move a delivery package from the moveable platform to a position within the delivery service pod.

Additionally, in some implementations, the delivery service pod 1204 can comprise a dispensing unit 1210. The dispensing unit 1210 can be configured to provide access from the delivery service pod 1204 to the passenger cabin 1202 of the autonomous vehicle 1200, for example, by deploying from the delivery service pod 1204 through the ceiling of the passenger cabin 1202. The dispensing unit 1210 can be deployed from the ceiling within the passenger cabin 1202 to allow for a vehicle occupant (e.g., a package recipient) to retrieve a package from the dispensing unit 1210 while traveling in the autonomous vehicle 1200. In some implementations, the package handling unit 1208 can be associated with and/or comprise the dispensing unit 1210. In such implementations, the package handling unit 1208 can facilitate transferring a delivery package from the delivery drone 1220 and move the delivery package from the delivery service pod 1204 to the passenger cabin 1202 such that the delivery package can be retrieved by a recipient in the passenger cabin 1202.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. An autonomous vehicle, comprising:
 a passenger cabin; and
 a delivery service pod positioned above the passenger cabin, the delivery service pod comprising:
  a package handling unit positioned above the delivery service pod configured to receive a delivery package from a delivery drone while the delivery drone is proximate to the autonomous vehicle, wherein the package handling unit is further configured to transfer the delivery package from the delivery drone into the delivery service pod;

a dispensing unit configured to transfer the delivery package from the delivery drone into the passenger cabin for retrieval by an occupant of the passenger cabin;

an access unit that is accessible from an exterior of the autonomous vehicle and configured for loading and unloading of a plurality of delivery crates into and out of the delivery service pod, a conveyor unit comprising a plurality of delivery crate holders, each of the delivery crate holders defined between a respective pair of sidewalls spaced apart within the delivery service pod, each of the delivery crate holders configured for receipt of one or more of the plurality of delivery crates, wherein at least a portion of the conveyor unit is positioned directly above the passenger cabin;

one or more processors configured for controlling rotation of the conveyor unit, based on delivery data that comprises a recipient identification for one of the plurality of delivery crates, in order to selectively align a respective one of the delivery crate holders containing the one of the plurality of delivery crates with the access unit; and a landing panel unit positioned on a top surface of the autonomous vehicle, wherein the landing panel unit is configured to accommodate the delivery drone.

2. The autonomous vehicle of claim 1, wherein the passenger cabin is separate from an interior of the delivery service pod, the plurality of delivery crate holders disposed within the interior of the delivery service pod.

3. The autonomous vehicle of claim 1, wherein the delivery service pod is integrated into the autonomous vehicle.

4. The autonomous vehicle of claim 1, wherein the access unit comprises an access door positioned above the passenger cabin, the access door openable to access the one of the delivery crate holders aligned with the access unit.

5. The autonomous vehicle of claim 4, wherein the access unit is configured such that only the one of the delivery crate holders aligned with the access unit is accessible through the access door.

6. The autonomous vehicle of claim 1, wherein the conveyor unit comprises a belt driven conveyor.

7. The autonomous vehicle of claim 1, wherein the delivery service pod further comprises an actuator configured to move the one or more of the plurality of delivery crates in the one of the delivery crate holders aligned with the access unit towards a retrieval position for a recipient exterior to the autonomous vehicle.

8. The autonomous vehicle of claim 1, further comprising an automated vehicle cleaning system with a robotic manipulator and a vacuum unit, the robotic manipulator of the automated vehicle cleaning system stowable within a central cavity of the delivery service pod that is accessible to the passenger cabin of the autonomous vehicle.

9. The autonomous vehicle of claim 8, wherein the robotic manipulator is configured for reaching exposed surfaces of the passenger cabin of the autonomous vehicle, and the robotic manipulator is configured to clean the exposed surfaces of the passenger cabin.

10. The autonomous vehicle of claim 1, wherein the delivery service pod is a non-removable delivery service pod integrated into a roof of the autonomous vehicle.

11. The autonomous vehicle of claim 10, wherein the delivery service pod is disposed entirely above the passenger cabin.

12. An autonomous vehicle, comprising:

a passenger cabin; and a delivery service pod integrated into a roof of the autonomous vehicle such that the delivery service pod is positioned above the passenger cabin, an interior of the delivery service pod separate from the passenger cabin, the delivery service pod comprising:

a package handling unit positioned above the delivery service pod configured to receive a delivery package from a delivery drone while the delivery drone is proximate to the autonomous vehicle, wherein the package handling unit is further configured to transfer the delivery package from the delivery drone into the delivery service pod;

a dispensing unit configured to transfer the delivery package from the delivery drone into the passenger cabin for retrieval by an occupant of the passenger cabin;

an access unit that is accessible from an exterior of the autonomous vehicle and configured for loading and unloading of a plurality of delivery crates into and out of the delivery service pod, a conveyor unit disposed within the interior of the delivery service pod, the conveyor unit comprising a plurality of delivery crate holders, each of the delivery crate holders defined between a respective pair of sidewalls spaced apart within the delivery service pod, each of the delivery crate holders configured for receipt of one or more of the plurality of delivery crates, wherein at least a portion of the conveyor unit is positioned directly above the passenger cabin;

one or more processors configured for controlling rotation of the conveyor unit, based on delivery data that comprises a recipient identification for one of the plurality of delivery crates, in order to selectively align a respective one of the delivery crate holders containing the one of the plurality of delivery crates with the access unit; and a landing panel unit positioned on a top surface of the autonomous vehicle, wherein the landing panel unit is configured to accommodate the delivery drone.

13. The autonomous vehicle of claim 12, wherein the access unit comprises an access door positioned above the passenger cabin, the access door openable to access the one of the delivery crate holders aligned with the access unit.

14. The autonomous vehicle of claim 13, wherein the access unit is configured such that only the one of the delivery crate holders aligned with the access unit is accessible through the access door.

15. The autonomous vehicle of claim 12, wherein the delivery service pod is a non-removable delivery service pod integrated into the roof of the autonomous vehicle.

16. The autonomous vehicle of claim 15, wherein the delivery service pod is disposed entirely above the passenger cabin.

17. The autonomous vehicle of claim 12, wherein the delivery data further comprises confirmation that the recipient is located proximate the autonomous vehicle.

18. A vehicle, comprising:

a passenger cabin; and a delivery service pod positioned above the passenger cabin, the delivery service pod comprising:

a package handling unit positioned above the delivery service pod configured to receive a delivery package from a delivery drone while the delivery drone is proximate to the vehicle, wherein the package handling unit is further configured to transfer the delivery package from the delivery drone into the delivery service pod;

a dispensing unit configured to transfer the delivery package from the delivery drone into the passenger cabin for retrieval by an occupant of the passenger cabin;

an access unit that is accessible from an exterior of the vehicle and configured for loading and unloading of a plurality of delivery crates into and out of the delivery service pod, a conveyor unit comprising a plurality of delivery crate holders, each of the delivery crate holders defined between a respective pair of sidewalls spaced apart within the delivery service pod, each of the delivery crate holders configured for receipt of one or more of the plurality of delivery crates, wherein at least a portion of the conveyor unit is positioned directly above the passenger cabin;

one or more processors configured for controlling rotation of the conveyor unit, based on delivery data that comprises a recipient identification for one of the plurality of delivery crates, in order to selectively align a respective one of the delivery crate holders containing the one of the plurality of delivery crates with the access unit; and a landing panel unit positioned on a top surface of the vehicle, wherein the landing panel unit is configured to accommodate the delivery drone.

19. The vehicle of claim 18, wherein the passenger cabin is separate from an interior of the delivery service pod, the plurality of delivery crate holders disposed within the interior of the delivery service pod.

20. The vehicle of claim 18, wherein the delivery service pod is integrated into the vehicle.

* * * * *